(12) United States Patent
Nordholt et al.

(10) Patent No.: US 9,002,009 B2
(45) Date of Patent: Apr. 7, 2015

(54) QUANTUM KEY DISTRIBUTION USING CARD, BASE STATION AND TRUSTED AUTHORITY

(75) Inventors: Jane Elizabeth Nordholt, Los Alamos, NM (US); Richard John Hughes, Los Alamos, NM (US); Raymond Thorson Newell, Santa Fe, NM (US); Charles Glen Peterson, Los Alamos, NM (US); Danna Rosenberg, Watertown, MA (US); Kevin Peter McCabe, Santa Fe, NM (US); Kush T. Tyagi, Washington, DC (US); Nicholas Dallman, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 715 days.

(21) Appl. No.: 12/895,720

(22) Filed: Sep. 30, 2010

(65) Prior Publication Data

US 2013/0101119 A1 Apr. 25, 2013

(51) Int. Cl.
*H04L 9/08* (2006.01)
*H04L 9/32* (2006.01)

(52) U.S. Cl.
CPC ............. *H04L 9/0852* (2013.01); *H04L 9/083* (2013.01); *H04L 9/0897* (2013.01); *H04L 9/3231* (2013.01)

(58) Field of Classification Search
USPC ............................ 380/256, 255, 278, 277, 44
See application file for complete search history.

(56) References Cited

U.S. PATENT DOCUMENTS

| | | | |
|---|---|---|---|
| 5,966,224 A | 10/1999 | Hughes et al. | |
| 6,263,435 B1 | 7/2001 | Dondeti et al. | |
| 6,748,083 B2 | 6/2004 | Hughes et al. | |
| 7,515,716 B1 | 4/2009 | Elliott | |
| 7,587,654 B2 | 9/2009 | Matsumoto | |
| 7,627,126 B1 | 12/2009 | Pikalo et al. | |
| 7,725,026 B2 | 5/2010 | Patel et al. | |

(Continued)

FOREIGN PATENT DOCUMENTS

| | | |
|---|---|---|
| CN | 101599826 | 12/2009 |
| EP | 2081317 | 7/2009 |

(Continued)

OTHER PUBLICATIONS

AFP-JIJI Press, "Japanese Develop System to Prevent Mobile Phone Tapping," *JIJI Press*, 4pp., downloaded from the World Wide Web (document marked Sep. 2, 2010).

(Continued)

*Primary Examiner* — William Goodchild
(74) *Attorney, Agent, or Firm* — Wilmer Cutler Pickering Hale and Dorr LLP

(57) ABSTRACT

Techniques and tools for quantum key distribution ("QKD") between a quantum communication ("QC") card, base station and trusted authority are described herein. In example implementations, a QC card contains a miniaturized QC transmitter and couples with a base station. The base station provides a network connection with the trusted authority and can also provide electric power to the QC card. When coupled to the base station, after authentication by the trusted authority, the QC card acquires keys through QKD with a trusted authority. The keys can be used to set up secure communication, for authentication, for access control, or for other purposes. The QC card can be implemented as part of a smart phone or other mobile computing device, or the QC card can be used as a fillgun for distribution of the keys.

44 Claims, 11 Drawing Sheets

(56) References Cited

U.S. PATENT DOCUMENTS

| | | | |
|---|---|---|---|
| 8,005,227 | B1 | 8/2011 | Linnell et al. |
| 8,213,620 | B1 | 7/2012 | Sussland et al. |
| 2001/0055389 | A1 | 12/2001 | Hughes et al. |
| 2002/0010857 | A1* | 1/2002 | Karthik ..................... 713/168 |
| 2003/0002768 | A1 | 1/2003 | Wood et al. |
| 2003/0098355 | A1* | 5/2003 | Johnson ..................... 235/492 |
| 2004/0017916 | A1 | 1/2004 | Staddon et al. |
| 2004/0128509 | A1* | 7/2004 | Gehrmann ................. 713/171 |
| 2005/0044356 | A1 | 2/2005 | Srivastava et al. |
| 2005/0141716 | A1 | 6/2005 | Kumar |
| 2006/0168446 | A1 | 7/2006 | Ahonen et al. |
| 2006/0212936 | A1 | 9/2006 | Berzanskis et al. |
| 2006/0263096 | A1 | 11/2006 | Dinu et al. |
| 2007/0177735 | A1 | 8/2007 | Mimih et al. |
| 2007/0192598 | A1 | 8/2007 | Troxel et al. |
| 2007/0223698 | A1 | 9/2007 | Tsurumaru |
| 2007/0280689 | A1 | 12/2007 | Boffi et al. |
| 2008/0031456 | A1 | 2/2008 | Harrison et al. |
| 2008/0144823 | A1 | 6/2008 | Abe et al. |
| 2008/0152147 | A1 | 6/2008 | Xia et al. |
| 2009/0022322 | A1 | 1/2009 | Trifonov |
| 2009/0092252 | A1 | 4/2009 | Noll et al. |
| 2009/0150561 | A1 | 6/2009 | Vig |
| 2009/0160670 | A1* | 6/2009 | Sipple ..................... 340/686.1 |
| 2009/0169015 | A1 | 7/2009 | Watanabe |
| 2009/0175450 | A1 | 7/2009 | Brandt |
| 2009/0175452 | A1 | 7/2009 | Gelfond et al. |
| 2009/0180615 | A1 | 7/2009 | Trifonov |
| 2009/0180616 | A1 | 7/2009 | Brodsky et al. |
| 2009/0180776 | A1 | 7/2009 | Brodsky et al. |
| 2009/0185689 | A1 | 7/2009 | Beal |
| 2009/0190759 | A1 | 7/2009 | Peev et al. |
| 2009/0202074 | A1 | 8/2009 | Trifonov et al. |
| 2009/0240913 | A1 | 9/2009 | Obana et al. |
| 2009/0257755 | A1 | 10/2009 | Buelow |
| 2009/0262942 | A1* | 10/2009 | Maeda et al. ................. 380/278 |
| 2010/0226659 | A1 | 9/2010 | Nishioka et al. |
| 2010/0257434 | A1 | 10/2010 | Harrison et al. |
| 2011/0208971 | A1 | 8/2011 | Bhattacharya et al. |

FOREIGN PATENT DOCUMENTS

| | | |
|---|---|---|
| KR | 10-0892763 | 4/2009 |
| WO | WO 2007/123869 | 11/2007 |
| WO | WO 2008/015758 | 2/2008 |
| WO | WO 2009/093034 | 7/2009 |
| WO | WO 2009/093036 | 7/2009 |
| WO | WO 2009/093037 | 7/2009 |
| WO | WO 2009/141586 | 11/2009 |
| WO | WO 2009/141587 | 11/2009 |
| WO | WO 2009/145392 | 12/2009 |
| WO | WO 2012/044852 | 4/2012 |
| WO | WO 2012/044855 | 4/2012 |
| WO | WO 2013/048671 | 4/2013 |
| WO | WO 2013/048672 | 4/2013 |
| WO | WO 2013/048674 | 4/2013 |

OTHER PUBLICATIONS

Buttler et al., "Free-space Quantum Key Distribution," *Phys. Rev. A*, vol. 57, Issue 4, pp. 2379-2382 (Apr. 1998).
Buttler et al., "Practical Free-space Quantum Key Distribution over 1 km," *Physical Review Letters*, vol. 81, No. 15, pp. 3283-3286 (Oct. 1998).
Chapuran et al., "Optical Networking for Quantum Key Distribution and Quantum Communications," *New Journal of Physics*, vol. 11, 19 pp. (Oct. 2009).
Damgård et al., "Secure Identification and QKD in the Bounded-Quantum-Storage Model," *Proc. 27th Annual Int'l Cryptology Conf. on Advances in Cryptology*, pp. 342-359 (Aug. 2007).
Duligall et al., "Low Cost and Compact Quantum Key Distribution," *New Journal of Physics*, vol. 8, 16 pp. (Oct. 2006).
Federal Information Processing Standard Publication 197, "The Advanced Encryption Standard (AES)," 51 pp. (Nov. 2001).
Federal Information Processing Standard Publication 198, "The Keyed-Hash Message Authentication Code (HMAC)," 20 pp. (Mar. 2002).
Graham-Rowe, "My Name Is Bob and I Make E-shopping a Cinch," *New Scientist*, pp. 30-31 (Nov. 2007).
Harrington et al, "Enhancing Practical Security of Quantum Key Distribution with a Few Decoy States," 4 pp. (Mar. 2005).
Hillery et al., "Quantum Secret Sharing," *Physical Review A*, vol. 59, No. 3, pp. 1829-1834 (Mar. 1999).
Hughes et al, "Comment on 'Quantum Key Distribution with 1.25 Gbps Clock Synchronization' by J. C. Bienfang et al., quant-ph/0405097," 4 pp. (Jul. 2004).
Hughes et al., "Free-space Quantum Key Distribution in Daylight," *Journal of Modern Optics*, vol. 47, Issues 2-3, pp. 549-562 (Feb. 2000).
Hughes et al., "Practical Free-Space Quantum Cryptography," 17 pp. (1998).
Hughes et al., "Practical Free-space Quantum Key Distribution over 10 km in Daylight and at Night," *New Journal of Physics*, vol. 4, pp. 43.1-43.14 (Jul. 2002).
Hughes et al, "Practical Quantum Cryptography for Secure Free-space Communications," 12 pp. (May 1999).
Hughes et al., "Quantum Cryptography over Underground Optical Fibers," *Advances in Cryptology*, 16 pp. (Jul. 1996).
Hughes et al., "Quantum Key Distribution," Los Alamos National Laboratory Physics Division, pp. 193-196 (Apr. 2004).
Hughes et al., "Practical Quantum Key Distribution over a 48-km Optical Fiber Network," LA-UR-99-1593, 13 pp. (1999).
Hughes et al, "Secure Communications Using Quantum Cryptography" *Proc. SPIE Photonic Quantum Computing*, vol. 3076, pp. 2-11 (Jul. 1997).
Mink, "Custom Hardware to Eliminate Bottlenecks in QKD Throughput Performance," *Proc. SPIE*, vol. 6780, 6 pp. (Sep. 2007).
Mitsubishi Electric, "One-time Pad Mobile Phone Software," 1 pp. (Oct. 2010).
Nordholt et al., "A New Face for Cryptography," *Los Alamos Science*, No. 27, pp. 68-85 (2002).
Nordholt et al., "Present and Future Free-space Quantum Key Distribution," *Proc. SPIE Free-Space Laser Communication Technologies XIV*, vol. 4635, pp. 116-126 (Apr. 2002).
Peters et al., "Dense Wavelength Multiplexing of 1550 nm QKD with Strong Classical Channels in Reconfigurable Networking Environments," *New Journal of Physics*, vol. 11, 17 pp. (Apr. 2009).
Rosenberg et al., "Long-Distance Decoy-State Quantum Key Distribution in Optical Fiber," *Physical Review Letters*, vol. 98, 4 pp. (Jan. 2007).
Rosenberg et al., "Practical Long-distance Quantum Key Distribution System Using Decoy Levels" *New Journal of Physics*, vol. 11, 10 pp. (Apr. 2009).
Rosenberg et al., "Quantum Key Distribution at Telecom Wavelengths with Noise-free Detectors," 8 pp. (also published as Rosenberg et al., "Quantum Key Distribution at Telecom Wavelengths with Noise-free Detectors," *IEEE Applied Physics Letters*, vol. 88, Issue 2, pp. 21108-1-21108-3 (Jan. 2006)).
Schneider, "A Critical Look at Wireless Power," *IEEE Spectrum*, 10 pp. (May 2010).
Toliver et al., "Demonstration of 1550 nm QKD with ROADM-based DWDM Networking and the Impact of Fiber FWM" *Conf. on Lasers and Electro-Optic*, 2 pp. (May 2007).
Toliver et al., "Experimental Investigation of Quantum Key Distribution Through Transparent Optical Switch Elements," *IEEE Photonics Technology Letters*, vol. 15, Issue 11, pp. 1669-1671 (Nov. 2003).
Wegman et al., "New Hash Functions and Their Use in Authentication and Set Equality" *Journal of Computer and System Sciences*, vol. 22, Issue 3, pp. 265-279 (Jun. 1981).
Wikipedia, "Quantum Cryptography," 10 pp. (2010).
Wikipedia, "Key Distribution," 5 pp. (2010).
Wikipedia, "One-time Pad," 12 pp. (2010).
ARDA, "A Quantum Information Science and Technology Roadmap—Part 2: Quantum Cryptography—Report of the Quantum Cryptography Technology Experts Panel," 100 pp. (Jul. 19, 2004).

(56) References Cited

OTHER PUBLICATIONS

ID Quantique SA, "CLAVIS² Quantum Key Distribution for R&D Applications," 2 pp. (downloaded from the World Wide Web on Sep. 9, 2011).
ID Quantique SA, "Redefining Precision CLAVIS²: The Most Versatile Quantum Key Distribution Research Platform," 4 pp. (document marked Jan. 2010).
ID Quantique SA, "Redefining Security CERBERIS The Best of Classical and Quantum Worlds: Layer 2 Link Encryption with Quantum Key Distribution," 2 pp. (document marked Jan. 2010).
ID Quantique SA, "Separation of Duties: Dedicated vs Integrated Encryption Appliances," White Paper, Version 1.0, 8 pp. (Feb. 2011).
International Search Report dated Mar. 13, 2012, from International Application No. PCT/US2011/054061, 3 pp.
MagiQ Technologies, Inc., "MAGIQ QPN™ 8505 Security Gateway Uncompromising VPN Security™," 4 pp. (document marked 2007).
Mitsubishi Electric Corporation, "Mitsubishi Electric Advance: Cryptography Edition," vol. 100, 29 pp. (Dec. 2002).
Mitsubishi Electric Corporation, "Mitsubishi Electric Advance: Information Security Technology," vol. 126, 27 pp. (Jun. 2009).
Mitsubishi Electric Corporation Press Release, "Mitsubishi, NEC, Tokyo University Realize Successful Interconnection of Quantum Encryption Networks for First Time in Japan," 4 pp. (document marked May 12, 2006).
National Institute of Information and Communications Technology Press Release, "Inauguration of the Tokyo QKD Network," 3 pp. (document marked Oct. 14, 2010).
Quintessence Labs Pty Ltd., "Breakthrough Technology," "Optical Subsystem Module/Card," "Modules of Operation," and "Application Areas," 5 pp. (documents downloaded from the World Wide Web on Sep. 9, 2011).
SECOQC, "SECOQC White Paper on Quantum Key Distribution and Cryptography," Secoqc-WP-v5, 28 pp. (Jan. 22, 2007).
Written Opinion dated Mar. 13, 2012, from International Patent Application No. PCT/US2011/054061, 3 pp.
Barrie, "Defeating Cyber-Attacks with Quantum Cryptography," *FoxNews.com*, 2 pp. (Mar. 2013).
Becker et al., "Merkle Signature Schemes, Merkle Trees and Their Cryptanalysis," 28 pp. (2008).
Greenemeier, "Quantum Cryptography Comes to Smart Phones," *Scientific American*, 1 p. (Feb. 2012).
Hughes et al., "Network-Centric Quantum Communcations with Application to Critical Infrastructure Protection," LA-UR-13-22718 (version 2), 7 pp. (May 2013).
International Preliminary Report on Patentability dated Apr. 2, 2013, from International Patent Application No. PCT/US2011/054061, 4 pp.
Kunz-Jacques et al., "Using Hash-Based Signatures to Bootstrap Quantum Key Distribution," 9 pp. (Sep. 2011).
Los Alamos National Laboratory, "Quantum Smart Card—QKarD," 1 p.
Ma et al., "High Speed Quantum Key Distribution Over Optical Fiber Network System," Journal of Research of NIST, vol. 114, No. 3, 29 pp. (May-Jun. 2009).
Menendez et al., "Network Applications of Cascaded Passive Code Translation for WDM-compatible Spectrally Phase-encoded Optical CDMA," Journal of Lightwave Technology, vol. 23, No. 10, 13 pp. (2005).
Menezes et al, "Handbook of Applied Cryptography," Table of Contents and Chapters 11-13, 177 pp. (1997).
MIT Technology Review, "Government Lab Reveals It Has Operated Quantum Internet for Over Two Years," 10 pp. (May 6, 2013).
Peev et al., "The SECOQC Quantum Key Distribution Network in Vienna," *New Journal of Physics*, vol. 11, 37 pp. (Jul. 2009).
Rass et al, "Quantum Coin-Flipping-Based Authentication," IEEE, 5 pp. (Jun. 2009).
Runser et al., "Progress Toward Quantum Communications Networks: Opportunities and Challenges," *Optoelectronic Integrated Circuits IX*, vol. 6476, 15 pp. (Mar. 2007).
Shih et al., "New Efficient Three-Party Quantum Key Distribution Protocols," *IEEE Journal of Selected Topics in Quantum Electronics*, 15:6 p. 1602-1606 (Nov./Dec. 2009).
Troiani, "Los Alamos Lab Uses Quantum Physics for Mobile Security," 2 pp., downloaded from http://www.thenewnewinternet.com/2012/01/26/los-alamos-lab-uses-quantum-physics-for-mobile-security/ (Jan. 26, 2012).
Vittorio, "Quantum Cryptography: Privacy Through Uncertainty," ProQuest, 9 pp. (Oct. 2002).
Yao, "Polarization in Fiber Systems: Squeezing out More Bandwidth," *The Photonics Handbook*, 5 pp. (2003).
Biham et al., "Quantum Cryptographic Network Based on Quantum Memories," *Physical Review*, vol. 54, No. 4, 8 pp. (1996).

\* cited by examiner acquiring keys through point-to-point QKD with TA 101 distributing keys that were
acquired through QKD

QUANTUM KEY DISTRIBUTION USING CARD, BASE STATION AND TRUSTED AUTHORITY

ACKNOWLEDGEMENT OF GOVERNMENT SUPPORT

The United States government has rights in this invention pursuant to Contract No. DE-AC52-06NA25396 between the United States Department of Energy and Los Alamos National Security, LLC for the operation of Los Alamos National Laboratory.

FIELD

A quantum communication device docks with a base station and engages in quantum key distribution with a trusted authority.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages. The process of producing such keys through QC is also called quantum key distribution ("QKD").

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QKD, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear or diagonal), sets the polarization state for a photon in the selected basis, and records the bit value (0 or 1), the selected sending basis and the time of transmission.

TABLE 1

Example bases and quantum states.

| Basis | 0 | 1 |
|---|---|---|
| Rectilinear (+) | 90° | 0° |
| Diagonal (x) | 45° | 135° (or −45°) |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set/measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

For the bases and states shown in Table 1, for example, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0) (90° and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Other approaches to QC exploit other quantum properties (e.g., quantum entanglement) to exchange information encoded in quantum states. In addition, techniques such as privacy amplification can be used to eliminate the partial information that an eavesdropper can acquire. Techniques such as information reconciliation can be used to resolve small discrepancies in the shared bit values of the transmitter and receiver.

The theoretical framework for QC has been established for over 25 years, and its advantages in terms of security of keys are well accepted. Over the past two decades, implementations of QKD systems have become cheaper, more reliable, easier to maintain (e.g., self-tuning, self-checking), and easier to use. Even so, compared to other security solutions that use public key cryptography, QKD system have tended to be expensive and difficult to deploy. A typical QKD system is large and operates only in point-to-point mode over a fiber connection between transmitter and receiver. Several commercially available QKD systems perform QKD only over point-to-point links, are not portable, and require a dedicated fiber connection. Moreover, their QC cannot co-exist with network traffic. As a result, despite the general knowledge that threats to public key cryptography exist from ever more powerful computers, QKD has not gained a commercial foothold.

SUMMARY

Innovations described herein facilitate the use of quantum key distribution ("QKD"). These innovations help make QKD more practical and useful for secure multi-party communication, authentication, access control and other applications.

According to one aspect of the innovations described herein, a quantum communication ("QC") device includes a connector, one or more integrated optics modules, and memory. The connector is adapted to couple with a base station for QC with a trusted authority. The integrated optics module(s), which are optically coupled to the connector, are adapted to transmit or receive information in a quantum channel as part of the QC through the base station. The memory stores one or more keys produced based at least in part on the QC.

For example, the integrated optics module(s) include a laser adapted to generate photons for transmission in the QC, a modulator adapted to modulate quantum state of output of the laser, and programmable logic configured to coordinate operations of the laser and the modulator. In some implementations, the integrated optics module(s) are adapted for communication over non-dedicated optical fiber for the quantum channel. The integrated optics module(s) can also include a network transceiver that is adapted to transmit and receive information in a public channel over the non-dedicated optical fiber.

In some implementations, the connector of the QC device includes a fiber connector, an electrical connector and a mechanical connector. The fiber connector is adapted to optically connect the integrated optics module(s) to a fiber connection of the base station. The electrical connector is adapted to draw electric power from the base station, which can then be used to power at least some of the integrated optics module(s), recharge a battery of the QC device, and/or cool at least some of the integrated optics module(s) to an operating temperature. The mechanical connector is adapted to mechanically attach the QC device to the base station. In other implementations, when the QC device is coupled to the base station, the connector of the QC device uses wireless means to convey quantum-state-encoded or other information to the base station and/or draw electric power from the base station. For use of the QC device as a fillgun, the QC device can include another connector adapted to transmit stored keys to another device. The QC device can be included in another device, such as a smart phone.

In some implementations, production of the quantum keys is contingent on the trusted authority authenticating the user. The QC device can include a biometric scanner and one or more encryption modules. The biometric scanner is adapted to accept biometric indicia of a user, and the encryption module(s) are adapted to encrypt the biometric indicia.

According to another aspect of the innovations described herein, a base station includes a network connection and a connector. The network connection is adapted to convey information in a quantum channel as part of QC between a QC device and trusted authority through the base station. The connector is adapted to couple with the QC device. In particular, the connector is adapted to optically couple the QC device with the network connection when the QC device is coupled to the base station. In some implementations, the connector is further adapted to supply electric power to the QC device when the QC device is coupled to the base station, for example, through a combined connector that includes a fiber connector, electrical connector and mechanical connector. In other implementations, when the QC device is coupled to the base station, the connector of the base station uses wireless means to receive quantum-state-encoded or other information from the QC device and/or supply electric power to the QC device.

According to another aspect of the innovations described herein, a computing system includes a QC module, a network transceiver, programmable logic configured to implement a trusted authority, and memory for storing quantum keys. The QC module is adapted to transmit or receive information in a quantum channel as part of QC with a QC device that is coupled to a base station. The network transceiver is adapted to transmit and receive information in a public channel. The programmable logic is configured to receive an encrypted message in the public channel from the QC device, authenticate a user of the QC device, produce the key(s) based at least in part on the QC with the QC device, and store the key(s) in association with the user of the QC device.

According to another aspect of the innovations described herein, a QC device couples to a base station for QC between the QC device and a trusted authority, produces one or more keys based at least in part upon the QC and based at least in part upon non-quantum communication with the trusted authority, and decouples from the base station. The QC device can then store the key(s) in memory of the QC device. For use as a fillgun, the QC device can transmit the key(s) to a second device for storage in memory of the second device. In some implementations, the QC uses a quantum channel over optical fiber, and the non-quantum communication uses a public channel over the optical fiber. The QC device can perform authentication with the trusted authority. For example, the QC device receives identifying information for a user (such as a fingerprint scan and PIN), encrypts a message that indicates the identifying information using an authentication key, and transmits the encrypted message to the trusted authority for authentication. The authentication key can be a pre-placed key in the QC device that is known to the trusted authority. For subsequent authentication, the authentication key can then be replaced with one of the keys generated by QC.

According to another aspect of the innovations described herein, a computing system that implements a trusted authority establishes QC with a QC device through a base station, the QC device being coupled to the base station. The computing system produces one or more keys based at least in part upon the QC and based at least in part upon non-quantum communication with the QC device. The computing system can then store the one or more keys in memory of the computing system. In some implementations, the QC uses a quantum channel over optical fiber, and the non-quantum communication uses a public channel over the optical fiber. The computing system can authenticate a user of the QC device. For example, the computing system receives an encrypted message that indicates identifying information for a user, decrypts the encrypted message, and determines whether to authenticate the user based at least in part on the identifying information.

According to another aspect of the innovations described herein, a first device communicates in a public channel over optical fiber in non-quantum communication with a second device. The first device also communicates in a quantum channel over the optical fiber in QC with the second device. The first device stores one or more keys that result from the communication in the quantum channel and at least some of the communication in the public channel. For example, the first device is a QC device coupled to a base station, and the second device is a computing system that implements a trusted authority.

The foregoing and other objects, features, and advantages of the invention will become more apparent from the following detailed description, which proceeds with reference to the accompanying figures.

DETAILED DESCRIPTION

Techniques and tools for quantum key distribution ("QKD") between a quantum communication ("QC") card, base station and trusted authority are described herein. In example implementations, the QC card is a relatively inexpensive, portable device that couples with a base station and acquires keys through QKD with a trusted authority. The keys can be used to set up secure communication, for authentication, for access control, or for other purposes. The QC card/trusted authority framework can be used with various protocols.

For the sake of presentation, in some places, the term "trusted authority" is used as shorthand for a computing system that implements the role of trusted authority, and the term "user" is used to indicate a computing system associated with a user. Unless the context clearly indicates otherwise, operations described herein are implemented with and performed by computing systems. For example, description of transmission of information to a trusted authority or user, determination of a value, and receipt of information from a trusted authority or user generally indicate operations with a computing system associated with the trusted authority or user. On the other hand, description of user input or biometric input to a user device implies a human user providing such input.

In addition, the terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose computer hardware with software implementing the functionality described herein. The term "user device" generally indicates a computing system associated with a user.

Various alternatives to the implementations described herein are possible. Certain techniques described with reference to flowchart diagrams can be altered by changing the ordering of stages shown in the flowcharts, by splitting, repeating or omitting certain stages, etc. Different aspects of the QKD framework described herein can be used in combination or separately. Different embodiments implement one or more of the described techniques and tools. Some of the techniques and tools described herein address one or more of the problems noted in the background. Typically, a given technique/tool does not solve all such problems.

I. Example Operating Environments

Figure 1:
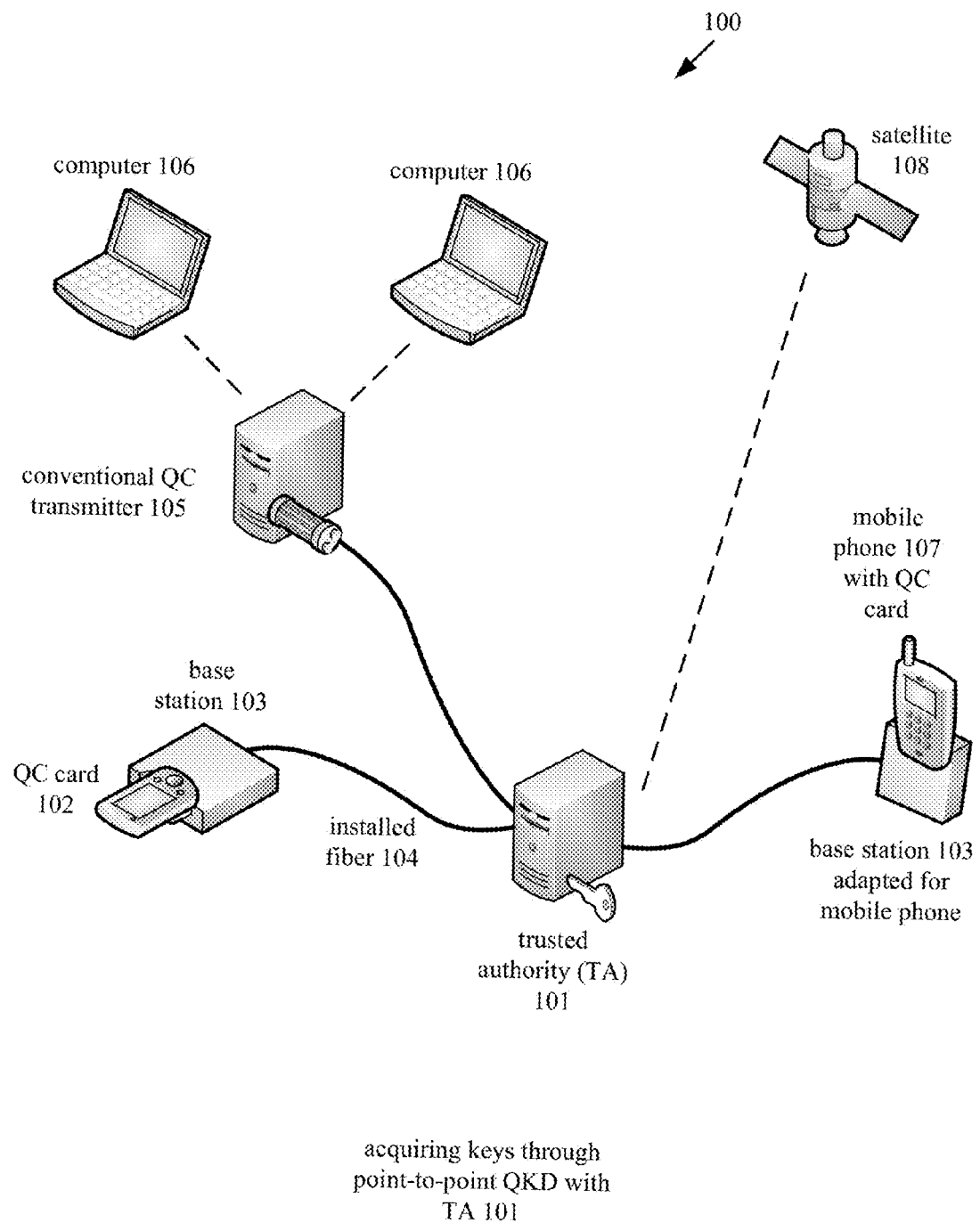
FIGS. 1, 2 and 3 are diagrams of example operating environments in which keys are acquired through QKD, disseminated, and used for encryption, authentication and access control.

FIG. 1 shows an example operating environment (100) in which various user devices acquire keys through QKD with a trusted authority (101). The user devices include a QC card (102) that couples with a base station (103), a mobile phone (107) that has a QC card, a satellite (108), and several computers (106) connected to a conventional QC transmitter (105). A user device can be for an individual user or for a business, financial institution or government institution as user.

A computing system implements the trusted authority (101). The trusted authority (101) authenticates a user, produces quantum keys in communication with a user device (or conventional QC transmitter (105)), and stores the quantum keys. At some point, the trusted authority (101) performs QKD with different devices, and the trusted authority (101) stores quantum keys produced in the different QKD sessions. Using quantum keys and other information provided by the trusted authority (101), a given user device can securely communicate with other user devices that have quantum keys from QKD with the trusted authority (101).

The QC card (102) contains a miniaturized QC transmitter. The QC card (102) couples with a base station (103), which provides a network connection with the trusted authority (101) and can provide electric power to the QC card (102). Example implementations for a base station (103), QC card (102), and trusted authority adapted for QKD with a QC card (102) are detailed in Section II. Whereas conventional QKD solutions have tended to be expensive and difficult to deploy, example implementations of the QC card (102) and base station (103) are relatively inexpensive. A QC card (102) is easily carried, and quantum keys generated with QKD facilitate security that is stronger than that provided with conventional non-quantum key distribution.

To generate quantum keys, a user inserts the QC card (102) into the base station (103). Typically, as a pre-condition for QKD, the trusted authority (101) authenticates the user. For example, the QC card (102) accepts a fingerprint scan and personal identification number ("PIN") from the user, encrypts the PIN and fingerprint scan data, and transmits the encrypted material to the trusted authority (101) for comparison against information previously provided to the trusted authority (101). Alternatively, the QC card (102) accepts other biometric information and/or other information that identifies the user.

The QC card (102) then performs QKD with the trusted authority (101) and stores the resulting quantum keys in secure memory on the QC card (102). In FIG. 1, the base station (103) is connected to the trusted authority (101) over installed fiber (104). The installed fiber (104) is used as a quantum channel for point-to-point QKD between the QC card (102) and trusted authority (101), for example, for transmission of photons encoded with quantum state information. The point-to-point QKD can happen over a single optical span or multiple spans in a fiber network whose topology supports QKD. For example, the topology includes intermediate routers between the QC card and trusted authority, but the routers preserve quantum state information. In FIG. 1, the installed fiber (104) is also used as a public channel to exchange non-quantum information between the QC card (102) and trusted authority (101), for example, authentication information, non-quantum information about measuring bases, recording basis in the QKD, and/or non-secret key information from the trusted authority (101). Alternatively, the QC card (102) and trusted authority (101) communicate non-quantum information over another type of network media (e.g., copper, RF) or free space (optical), or over a fiber network having another network topology.

In one use scenario, a business purchases QC cards (102) for its employees and purchases one or more base stations (103) located at its facilities. An employee periodically plugs his or her QC card (102) into a base station to load up on quantum keys. The employee can then use the quantum keys for activities such as purchasing over the Internet, authentication or access control at a remote site.

The mobile phone (107) includes a QC card (102) as well as conventional mobile phone components. The mobile phone (107) couples with a base station (103) that is adapted to connect to the mobile phone (107) and provides a network connection to the trusted authority (101). The mobile phone's base station (103) can also provide electric power and a data connection for synchronization of information on the mobile phone (107). The mobile phone (107) stores quantum keys produced by the QC card (102) and trusted authority (101). Example implementations for a mobile phone (107) that includes a QC card are described below in Section II.

As shown in FIG. 1, the trusted authority (101) can also produce quantum keys for devices other than a QC card (102). For example, the trusted authority (101) performs QKD to distribute quantum keys to a low-orbit satellite (108) using equipment for QC transmission and reception through free space. Or, the trusted authority (101) performs QKD with a conventional QC transmitter (105), which directly conveys the quantum keys produced by QKD to a locally connected computer (106) at a secure facility. The conventional QC transmitter (105) can connect to the trusted authority (101) over installed fiber (104) (e.g., standard fiber for telecommunications in a building, FTTx link, metro area, etc.) or free space (e.g., rooftop to rooftop, airplane to ground, ship to ship, satellite to ground).

In any case, the QKD produces cryptographic-quality secret random numbers, which can be used as quantum keys for encryption, secure multi-party audio or video communication, authentication, bank transactions, facility access control, access control for a computing system or database, access control for an online control system, vehicle access, digital signatures, e-voting, tele-presence or another application. As random numbers, the quantum keys have forward secrecy. The quantum keys do not depend on any pre-placed secret key, and they are not subject to conventional attacks, nor are they vulnerable to future advances that exploit increased computing power or flaws discovered in key generation algorithms. Some of the quantum keys produced by QKD can be used for authentication and other set-up operations before subsequent QKD sessions, so that such set-up operations are automatic and seamless to the user.

In the examples shown in FIG. 1, the computing system that implements the trusted authority (101) has a QC receiver. Alternatively, computing system that implements the trusted authority (101) has a QC transmitter, and the other party to QKD includes a QC receiver.

Figure 2:
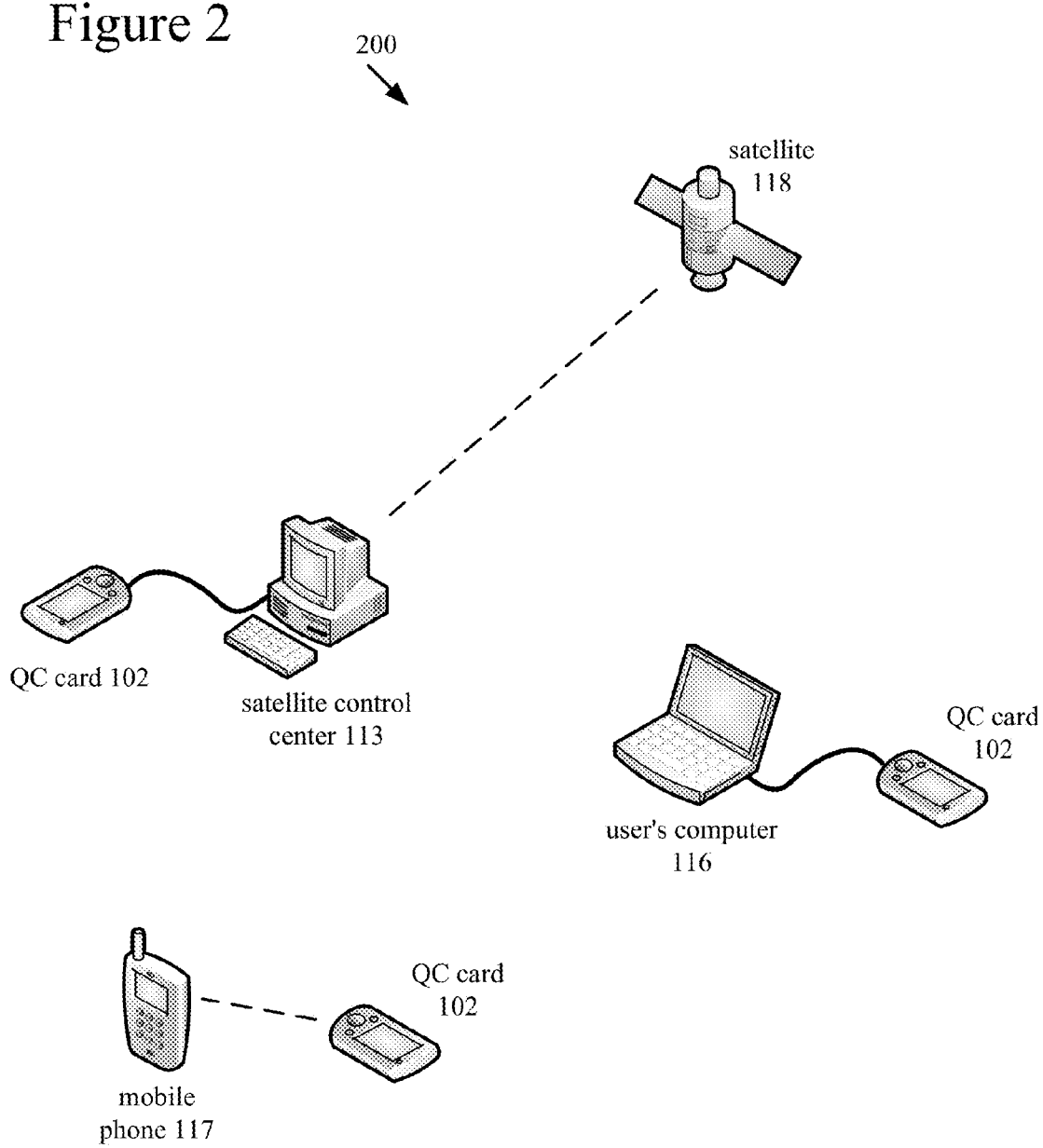

FIG. 2 shows an example operating environment (200) in which a QC card (102) further distributes quantum keys obtained through QKD with the trusted authority (101). A QC card (102) can distribute stored quantum keys to a mobile phone (117) or a user's computer (116). For example, the QC card (102) transmits the quantum keys over a point-to-point fiber connection or wireless connection. Or, a QC card (102) provides quantum keys to a satellite control center (113), which uploads the quantum keys to a satellite (118).

In this way, the QC card (102) can be used as a "fillgun" to load quantum keys from its secure memory into a remote encryptor on a spacecraft, naval vessel or other vehicle. For example, the QC card (102) loads up with quantum keys while coupled with a base station at a terminal, is carried to a spacecraft before launch, and then loads the quantum keys onto a computing device aboard the spacecraft. The computing device aboard the spacecraft can then use the quantum keys for secure communication with the terminal or another device.

Figure 3:
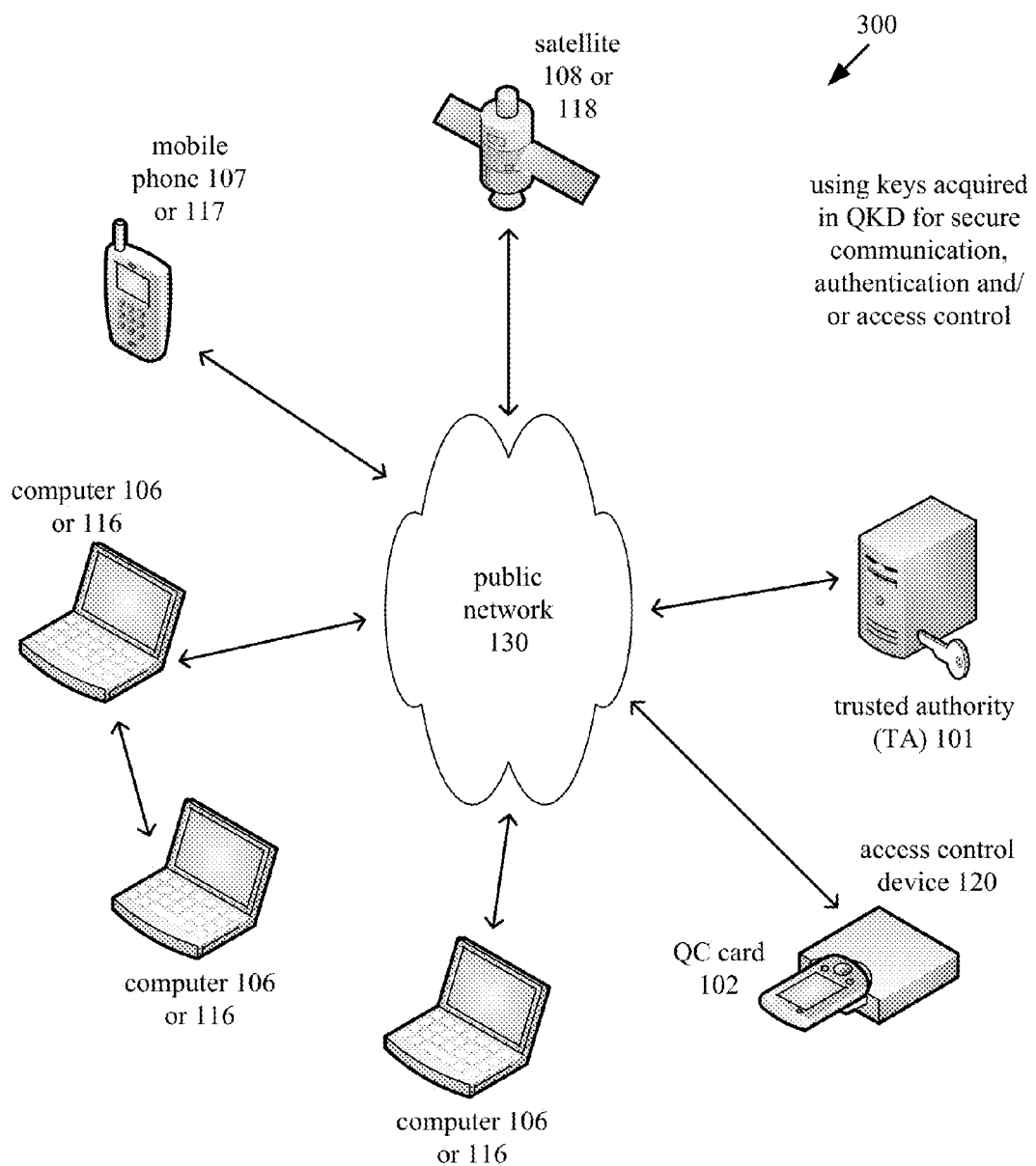

FIG. 3 shows an example operating environment (300) in which quantum keys distributed through QKD are used to establish secure communication, used for authentication or used for access control. With one or more quantum keys and information provided by the trusted authority (101), a user device can securely communicate with another user device directly or over a public network (130) such as the Internet. Or, the user device can use a quantum key to authenticate itself to another user device or gain access to a facility through an access control device (120). Within the network of user devices that have each received quantum keys from QKD with the trusted authority, one user device can establish a secure connection with any other user device without QKD between the two user devices, for example, using a session key provided by the trusted authority separately to each of the two user devices, the session key having been encoded with a quantum key known to that user device and the trusted authority.

A user device shown in FIG. 3 can acquire its quantum keys through any form of QKD with the trusted authority (101). Some of the user devices shown in FIG. 3 acquired quantum keys directly through QKD with the trusted authority (101), as illustrated in FIG. 1. For example, the mobile phone (107) and QC card (102) acquired quantum keys from QKD with the trusted authority. The user computers (106) acquired quantum keys directly from a local connection to a conventional QC transmitter in QKD with the trusted authority. Other user devices shown in FIG. 3 acquired quantum keys from a QC card, as shown in FIG. 2. For example, the satellite (118), mobile phone (117) and user computers (116) acquired quantum keys from a QC card (102). In any case, a user device can use its quantum keys at a location different than the location at which the quantum keys were distributed to the user device.

The trusted authority (101) is both a QC node (as in FIG. 1) and a conventional network contact point. Aside from QKD, acting in the role of a network server, the trusted authority (101) can exchange information using conventional network communication with a user device that acts in the role of a network client. For example, the user device can receive material from the trusted authority (101) that has been encrypted with one of its stored quantum keys.

Quantum keys can facilitate secure communication even when the quantum keys are not used for algorithmic encryption. If two user devices have the same quantum keys, a first user device can use stored quantum keys to determine patterns to spread information content between wavelengths and/or time slots of a signal, then spread the information according to the patterns in transmission. The second user device determines the patterns from the stored quantum keys and de-spreads the information content from the signal it receives. The patterns depend on the stored quantum keys, but security is provided at the physical layer in transmission, not through use of the stored quantum keys in encryption.

II. QKD Using QC Card, Base Station and Trusted Authority

A typical smartcard is a small plastic device, the size of credit card, with an embedded microprocessor. Some smartcards use a hashing function and pre-placed secret keys to generate encryption keys. The encryption keys are then used according to conventional encryption techniques for communication, authentication, access control, etc. Although smartcards are relatively inexpensive and easy to carry, they do not provide security strong enough for many scenarios.

The mechanism of generating encryption keys using a hashing function is susceptible to attack with conventional computers. In the past, hashing functions have been undermined by improvements in algorithmic attacks, and there are no guarantees that current smartcard technology has not been successfully undermined already. At base, smartcards that use known algorithms to generate keys produce random numbers that do not have complete forward secrecy, which means a current key can potentially be predicted from the last key. An adversary can record numbers entered by a legitimate user from his smartcard and crack the algorithm or determine the pre-placed secret key, allowing the adversary to make usable keys to impersonate the legitimate user.

On the other hand, quantum keys produced by QKD have strong forward secrecy. To date, however, QC security solutions have tended to be expensive and difficult to deploy.

A QC card combines advantages of smartcard technology with advantages of QKD. In example implementations, a QC card is relatively inexpensive, lightweight and portable. A QC card stores quantum keys produced by QKD with a trusted authority, and the quantum keys have strong forward security.

In general, a QC card couples with a base station and produces quantum keys by QKD with a trusted authority. For example, a user inserts the QC card into the base station, and the QC card transmits authentication information to the trusted authority. If the user is authenticated, the QC card and trusted authority produce cryptographic-quality secret random numbers for quantum keys. The QC card stores the quantum keys in secure memory. The QC card can later use the quantum keys or distribute the quantum keys to another device for use. Either way, the quantum keys can be used for encryption, authentication, access control or digital signatures by a user. Because the quantum keys produced in QKD are randomly generated and do not depend on any pre-placed secret keys, the quantum keys provide strong security for access to facilities, access to computing systems, bank transactions, secure multi-party communication and other applications.

In some embodiments, a QC card includes a miniaturized QC transmitter, and the computing system for the trusted authority includes a QC receiver. For example, the QC card includes integrated electro-optical modules capable of selectively producing individual photons having any of four non-orthogonal polarization states for QKD (e.g., 0°, 45°, 90° or 135°). The QC card can be fabricated as a single integrated unit with a small footprint. Compared to conventional QC transmitters, the QC transmitter in the QC card is a low-power transmitter. Nonetheless, to the extent energy consumption might be a concern, the QC card can draw electric power from the base station at which the QC card is coupled for QKD. The QC card is lightweight and robust, and it can be packaged in a mobile phone or other device for which limited size, weight and power consumption are desirable attributes.

The QC card/trusted authority framework can produce quantum keys that are used for secure multi-party communication or authentication according to any available protocol for key management (e.g., symmetric key management) and/or authentication.

A. Generalized Techniques for QKD Between QC Card and Trusted Authority.

Figure 4A:
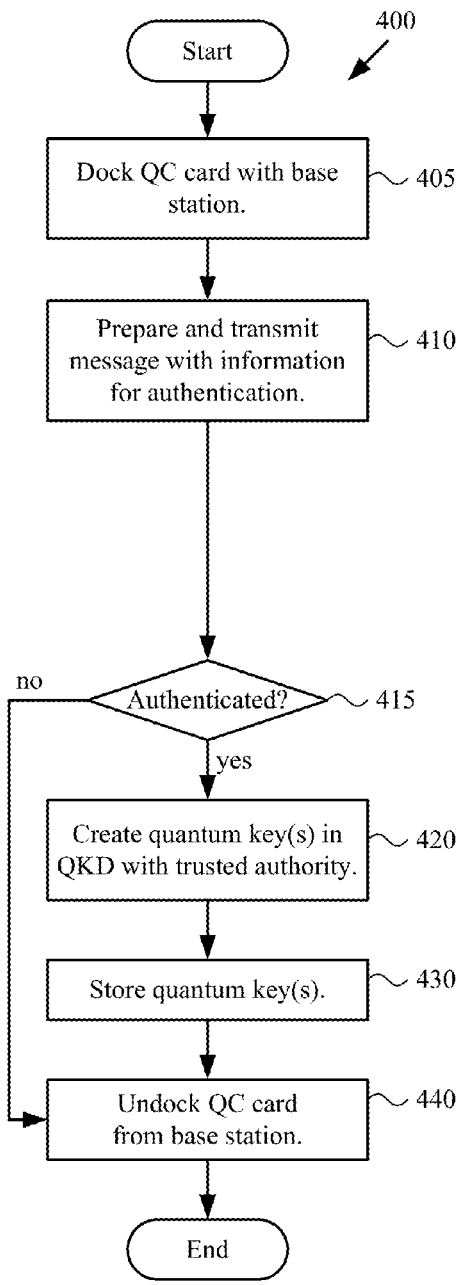
FIGS. 4a and 4b are flowcharts illustrating different aspects of a generalized protocol for QKD in a framework with a QC card, base station and trusted authority.
Figure 4B:
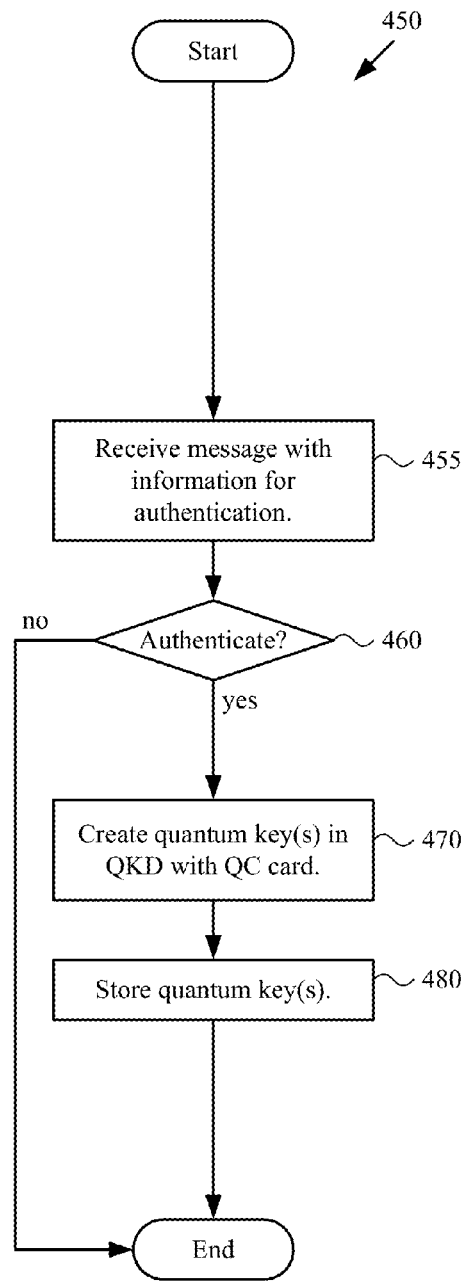

FIG. 4a illustrates a generalized technique (400) for a QC card to acquire quantum keys through QKD with a trusted authority. Although some acts of FIG. 4a (e.g., docking QC card with a base station, undocking QC card from the base station) are physically performed by a user, the QC card performs corresponding acts (e.g., coupling, decoupling). FIG. 4b illustrates a corresponding technique (450) for the trusted authority to acquire quantum keys through QKD with the QC card.

With reference to FIG. 4a, a user docks (405) the QC card with a base station. At this point, the QC card couples to the base station for QC between the QC card and the trusted authority. The base station provides a network connection to the computing system that implements the trusted authority. Upon coupling with the base station, the QC card optically couples to the network connection of the base station. In some implementations, the optical coupling between the QC card and base station uses a fiber connection. Alternatively, the optical coupling uses a wireless connection (e.g., transmission over free space).

In some implementations, the network connection provided by the base station is a fiber connection to the computing system that implements the trusted authority. The network connection can be a dedicated point-to-point fiber connection for direct communication between the QC card and the trusted authority, a dedicated fiber connection over multiple spans connected with one or more optical routers enabling QC transmission and reception through the optical router(s), or a commercial (non-dedicated) fiber connection over a single span or multiple spans of a network of devices with QC transmission and reception equipment. QC typically uses weak photon pulses to mitigate problems that could arise from interception of extra photons. Dedicated fiber (sometimes called "dark" fiber) conveys weak photon pulses encoding quantum state information and may also convey bright synchronization pulses. The weak photon pulses are relatively easy to detect, however, due to the absence of other traffic. On the other hand, for QC over non-dedicated fiber, weak photon pulses that encode quantum state information are more difficult to detect. Non-dedicated fiber (sometimes called "light" fiber) conveys quantum-state-encoded information in weak photon pulses but also conveys conventional network traffic in bright pulses. Even when synchronization, temporal multiplexing and wavelength multiplexing are used to separate the weak photon pulses of a quantum signal from the bright pulses of other traffic, scattering and other impairments can complicate the task of detecting the weak photon pulses. Various steps can be taken to improve QC performance over non-dedicated fiber. For details, see (1) Peters et al., "Dense Wavelength Multiplexing of 1550 nm QKD with Strong Classical Channels in Reconfigurable Networking Environments," New Journal of Physics 11, 17 pp. (April 2009) and (2) Chapuran et al., "Optical Networking for Quantum Key Distribution and Quantum Communications," New Journal of Physics 11, 19 pp. (October 2009).

The network between the QC card and trusted authority can include a single span or multiple spans. If there are two spans, for example, and routing between them disrupts quantum state of the quantum-state-encoded information, the QC card can perform QKD with an intermediate trusted node, which also performs QKD with the trusted authority. The intermediate trusted node subsequently distributes quantum keys to the QC card and trusted authority, respectively, that have been encrypted using the quantum keys resulting from the respective QKD sessions. Or, if the quantum state is not disrupted, the QC card can perform QKD directly with the trusted authority across multiple spans.

Aside from providing a network connection, the base station can also provide power to the QC card. For example, when the user docks (405) the QC card, the QC card electrically couples with the base station. The QC card draws electric power from the base station. The QC card can use the electric power to power one or more integrated optics modules and/or cool one or more integrated optics modules to an operating temperature for QC. The electrical coupling between the QC card and base station can be implemented with a conventional wired technique, or the electrical coupling can be implemented with a wireless technique (e.g., to transfer power by electro-magnetic induction over a short range between the QC card and a charging pad of the base station). In some implementations, the QC card and trusted authority perform QC over free space, with the base station providing electric power to the QC card and/or aligning the QC card when the QC card is coupled to the base station.

Generally, in the techniques (400, 450) shown in FIGS. 4a and 4b, the base station is a "dumb" terminal that provides a network connection and, in some cases, electric power. The base station need not be trusted, since the QC card performs the actual QKD with the trusted authority. In alternative embodiments, such as those described at the end of section II.C, the base station is partially trusted or trusted and provides additional functionality for aspects of QKD.

When authentication of a user is a condition of QKD, the QC card prepares and transmits (410) a message with information for authentication. For example, the QC card receives identifying information for a user, such as a fingerprint scan, other biometric indicia, numeric input for a PIN, or other user input for personal information. The QC card encrypts the identifying information using an authentication key and transmits the encrypted information as the message to the trusted authority for authentication of the user.

To establish QC with the QC card coupled with the base station, the trusted authority authenticates the user. The trusted authority receives (455) the message with the information for authentication. The trusted authority checks (460) the message and, if appropriate, authenticates the user. For example, the trusted authority receives encrypted information as the message, where the information is identifying information for the user that has been encrypted using an authentication key. The trusted authority decrypts the identifying information using the authentication key and determines whether to authenticate the user based on the identifying information.

In general, for an initial QKD session between the QC card and trusted authority, the authentication key used to encrypt/decrypt the identifying information is a pre-placed key in the QC card that is known to the trusted authority. The initial key can be replaced with a quantum key subsequently generated in the QKD between the QC card and trusted authority. The new quantum key is stored in a special location in the QC card and trusted authority for use in authentication before the next QKD session. In this way, reuse of the initial authentication key is avoided and security is improved.

The trusted authority can send a message to the QC card indicating the user has been authenticated. The QC card checks (415) whether authentication of the user has succeeded.

If authentication has succeeded, the QC card and trusted authority create (420, 470) one or more quantum keys in QKD with each other. The quantum key(s) are produced based upon QC (information encoded in quantum states) and non-quantum communication (e.g., information exchanged over a public channel to settle upon the quantum keys) between the QC card and trusted authority.

The mechanics of the QC depend on implementation. For example, the QC card includes a connector that is optically coupled to one or more integrated optics modules for a QC transmitter, which is adapted to transmit information encoded in quantum states to a QC receiver of the trusted authority. The quantum-state-encoded information is transmitted in a quantum channel as part of the QC between the QC card and trusted authority through the base station. FIGS. 5 and 6a-6c show details for example QC cards with QC transmitters, and operations of the example QC cards are explained below with reference to those figures. Alternatively, the QC card includes one or more integrated optics modules for a QC receiver that receives information encoded in quantum states from a QC transmitter of the trusted authority. The QC card and trusted authority can use the same network connection for QC and non-quantum communication. For example, QC between the QC card and trusted authority uses a quantum channel over optical fiber, and non-quantum communication between the QC card and trusted authority uses a public channel over the optical fiber. Alternatively, the QC and non-quantum communication use different network connections. For example, the QC uses an optical connection but the non-quantum communication uses a non-optical connection.

The QC card stores (430) the quantum key(s). The trusted authority also stores (480) the quantum key(s). For example, the QC card stores the quantum key(s) in secure memory of the QC card, and the trusted authority stores the quantum key(s) in secure memory of the trusted authority.

The user then undocks (440) the QC card from the base station. At this point, the QC card decouples from the base station. In some scenarios, the QC card is used as a fillgun and transmits stored quantum keys to another user device for storage in memory of the other user device. In other scenarios, the QC card itself uses stored quantum keys for secure communication, authentication, access control, etc. with one or more other devices that have received quantum key information from the trusted authority.

For example, in some use scenarios, the QC card (or device including the QC card) contacts the trusted authority over a public channel (e.g., wireless Internet connection, cell phone connection), encrypts identifying information using a stored quantum key, and transmits the encrypted identifying information to the trusted authority over the public channel. The trusted authority responds with encrypted key material, which is decrypted using the same quantum key or the next stored quantum key. The key material can then be used for secure communication with the other device(s), authentication to the other device(s), access control past the other device(s), etc. The other device(s) similarly communicate with the trusted authority over the public channel and similarly receive encrypted key material that the respective other device(s) can decrypt and use.

In other use scenarios, a QC card generates secure encryption keys used to encrypt payload data at a remote site. The encrypted payload data are returned to a secure location and, after the QC card has authenticated the user, decrypted using the secure encryption keys stored on the QC card. Depending on security level, the QC card can authenticate the user using a locally stored biometric signature or PIN, or the QC card can encrypt identifying information for the user and transmit the encrypted identifying information to the trusted authority for authentication. Or, using an approach described in the preceding paragraph, the QC card can communicate the secure encryption keys to another computing system that has been granted decryption privileges, and the other computing system can decrypt the encrypted payload data using the secure encryption keys. By using a mathematical protocol with a secret key on the QC card the encryption keys can be securely transferred. When key information is transferred over unsecure lines, the trusted authority can use this protocol and knowledge of secret bits already on the QC card (and other computer, if desired) to provide secure key transport.

Alternatively, the QC card and one or more other device(s) use quantum keys for secure communication or other functions according to another protocol.

B. Example QC Cards.

Figure 5:
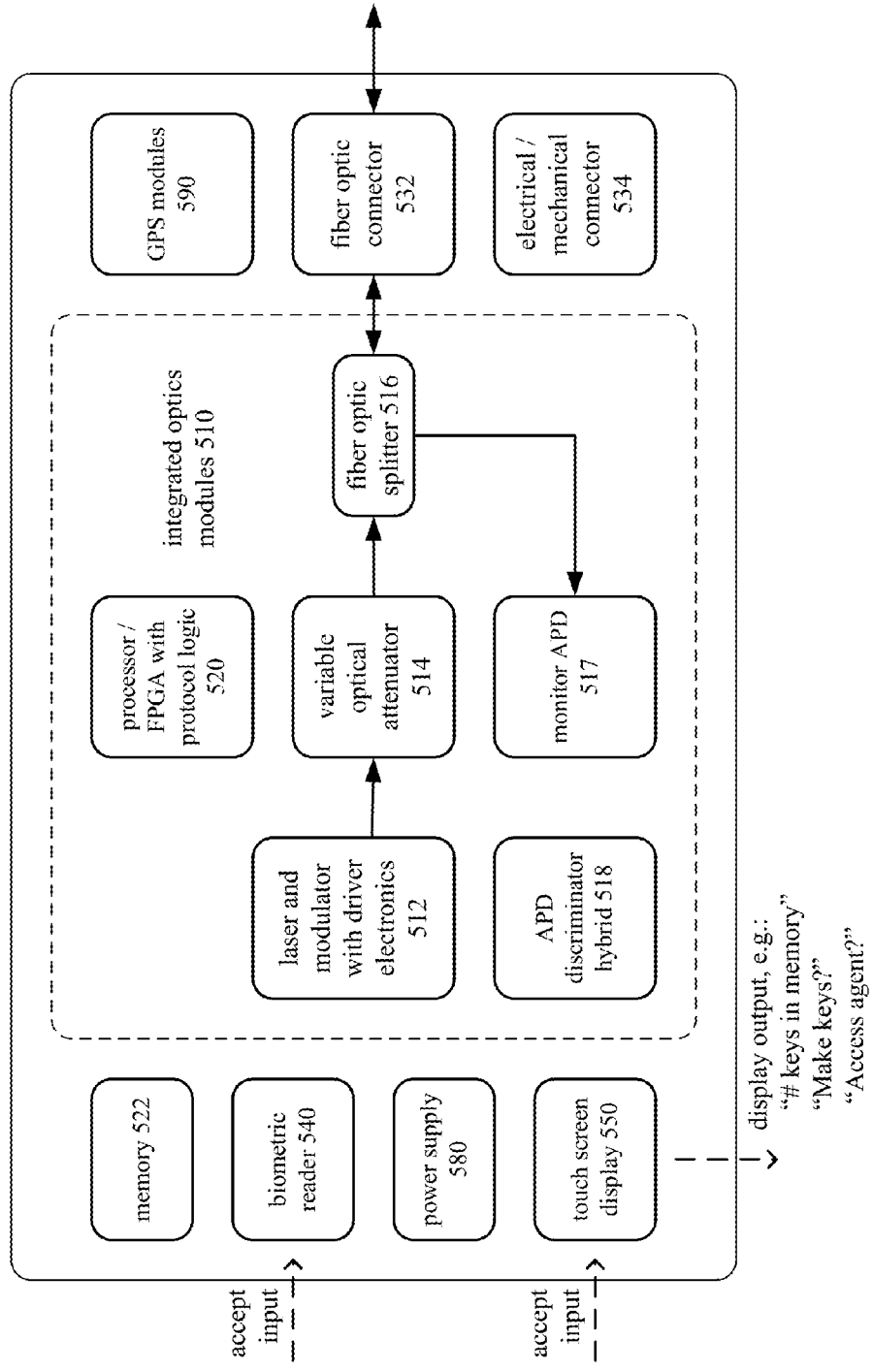
FIG. 5 is a block diagram of a generalized QC card.
Figure 6A:
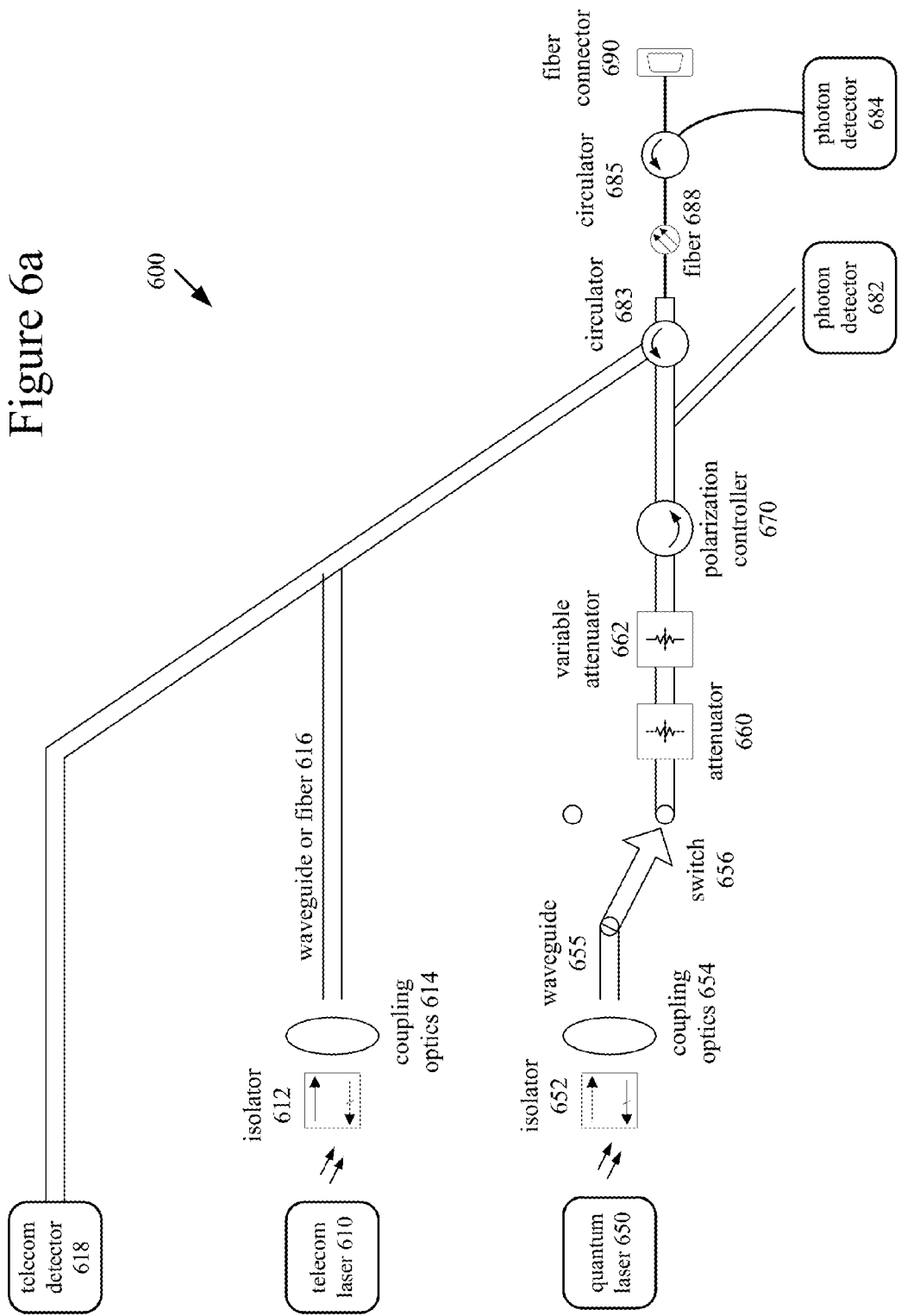
FIGS. 6a-6c are block diagrams of example implementations of integrated optics modules for a QC card.
Figure 6B:
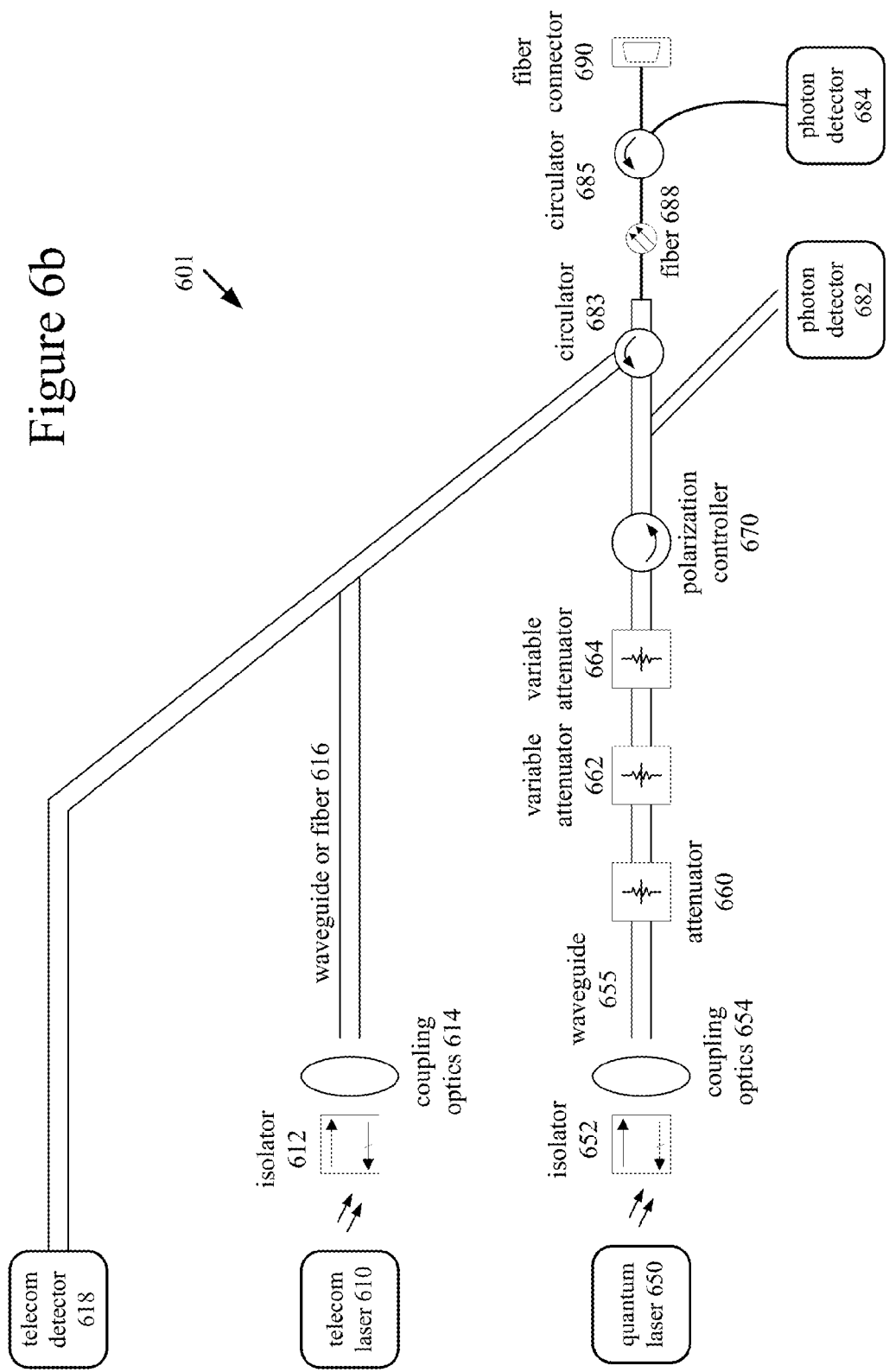
Figure 6C:
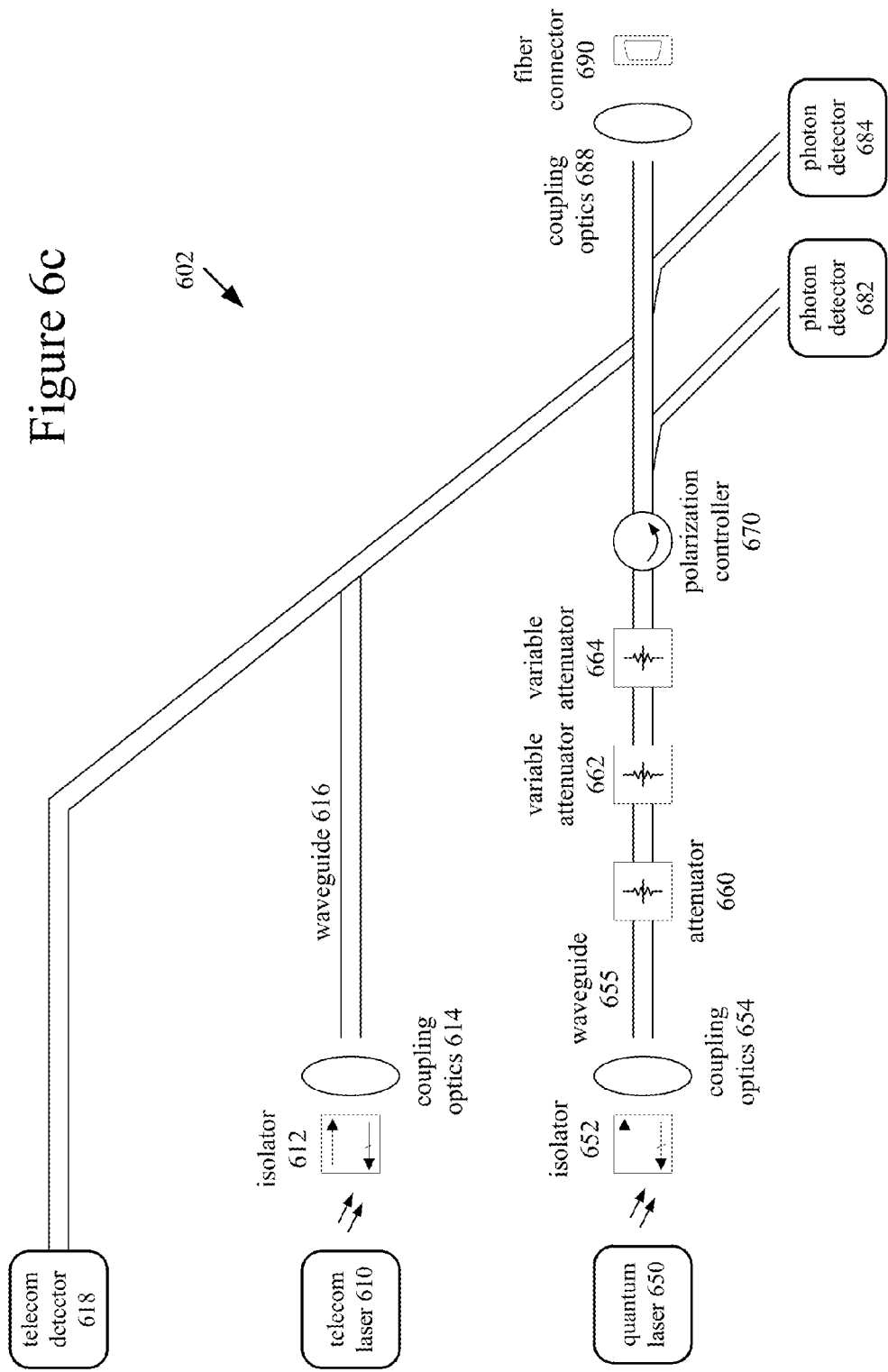

FIG. 5 shows an example QC card (500) adapted for use in a QC card/trusted authority framework. At a high level, the QC card (500) includes a connector (or connectors), integrated optics modules, and memory for storing quantum keys. The connector(s) are adapted to couple (via wired or wireless connection) with a base station for QC with a trusted authority. The integrated optics modules are adapted to transmit information as part of the QC through the base station. FIGS. 6a-6c detail example implementations of integrated optics modules, in which key electro-optical elements have been miniaturized in ways that increase stability for QC transmission while reducing weight and size.

1. Generalized QC Card.

In FIG. 5, the integrated optics modules (510) are adapted for communication over non-dedicated optical fiber. For QC over the optical fiber as a quantum channel, the integrated optics modules (510) transmit binary information for which modulation of quantum state is measured (by the QC receiver). The integrated optics modules (510) also provide a network transceiver adapted to transmit and receive information in a public channel over the optical fiber, transmitting and receiving binary information for which modulation of quantum state is not measured (by the QC receiver).

Among the integrated optics modules (510), the laser and modulator with driver electronics (512) include a laser adapted to generate photons for transmission in the QC and a modulator adapted to modulate quantum state (e.g., polarization state) of output of the laser. The modulator is optically coupled to the laser and can be implemented, for example, with a lithium niobate modulator that modulates polarization state between 0°, 45°, 90° and −45°. (The system can use polarization tracking in the optical fiber to maintain the polarization state from the QC transmitter to QC receiver.) Alternatively, the modulator is implemented with another kind of integrated-optic or bulk-crystal modulator. The choice of modulator is implementation-specific and can depend, for example, on suitability of the modulator for the specific wavelength of light from the laser, operating frequency of the modulator and/or state purity for the polarization states produced.

The variable optical attenuator (514) is optically coupled to the laser. The attenuator is adapted to reduce photons per pulse of the laser, which improves security of the QC by foiling eavesdropping attempts that intercept extra photons. The monitor avalanche photodiode ("APD") (517) is split from other modules by the fiber optic splitter (516) and adapted to measure number of photons per pulse from the laser used for QC. For example, the APD (517) is implemented with one or more InGaAs photon detectors. The APD (517) provides feedback used to control the laser and attenuator (514) for QC. Another detector (not shown) receives information as a conventional fiber optic receiver for non-quantum communication.

The processor/field-programmable gate array ("FPGA") with protocol logic (520) controls different operations as part of the QC with the trusted authority. In particular, the processor/FPGA (520), which is electrically coupled to the module (512), is configured to coordinate operations of the laser and the modulator through driver electronics included with the laser and modulator (512). A random number generator generates a series of random bits for high-quality random numbers. With high-fidelity polarization control, the processor/FPGA (520) controls the polarization of photons with the modulator to encode random bits as different polarization states according to a QC protocol. The processor/FPGA (520) monitors the number of photons per pulse (measured with the APD (517)) for the QC. Through control of the laser and variable optical attenuator (514), the processor/FPGA (520) can selectively reduce photons per pulse of the laser to an average level of a single photon per pulse.

The processor/FPGA (520) thus controls the timing and pattern of the single-photon pulses produced by the laser for QC. The processor/FPGA (520) also controls the timing and pulses of bright pulses produced for synchronization, non-quantum communication and/or other purposes. The timing and pattern of single-photon pulses and bright pulses can follow a known pattern that is precisely timed by the GPS modules (590) and an oscillator. In addition to helping synchronize the QC transmitter of the QC card (500) and QC receiver at the trusted authority, the bright pulses can send polarized photons to the trusted authority for the trusted authority to track and correct polarization state variations due to the fiber connection between the QC card (500) and trusted authority.

In some implementations, the bright pulses are produced by a second laser that also provides functionality for a conventional transceiver (not QC). In other implementations, the same laser is used for QC transmission, QC control/tuning and conventional transceiver functions, but less attenuation is applied for the conventional transceiver functions and QC control/tuning functions. For example, the integrated optics modules (510) can include multiple attenuators to facilitate switching from transmission of a bright timing/control pulse to a single-photon pulse with the same laser. Use of a laser in the QC card (500) for synchronization, tuning, control, etc. operations with a QC receiver can be considered part of QC (since the QC timing/control pulses are interspersed with quantum-state encoded information), even though the timing/control pulses do not include quantum-state encoded information. The QC card (500) transmits other information (e.g., information about sending bases in QKD, other QKD protocol information, requests for non-secret key information from the trusted authority) in non-quantum communication over the optical fiber as a public channel.

For other aspects of the QC protocol, the processor/FPGA (520) controls operations in concert with the trusted authority to record the quantum state and sending basis per pulse for the QC, transmit (in non-quantum communication with the trusted authority in a public channel) the recorded sending bases to the trusted authority, and otherwise process conventional QC protocol elements to determine the quantum keys. The processor/FPGA (520) can coordinate operations for privacy amplification and decoy states to further improve the security of QKD. Privacy amplification reduces the length of a shared bit string (e.g., by hashing with a hash function) to reduce partial information that an eavesdropper might have gained. The final length of the string can be set depending on the number of errors detected. For imperfect single-photon sources such as weak laser pulses, decoy states of different average photon numbers (brightness) can be transmitted so that the error rate and number of single photons in a bit string can be determined and used to regulate the degree of privacy amplification.

The memory (522) stores one or more keys that are produced based at least in part on the QC. For example, the memory (522) stores quantum keys produced in QKD between the QC card and the trusted authority. The memory (522) can also store other keys, such an initial pre-placed secret key used for authentication purposes. In some implementations, the memory (522) is secure memory in that the QC card (500) controls access to the memory (522), the keys are stored in encrypted form in the memory (522), and/or the memory (522) is resistant to physical tampering. The memory (522) can be fabricated along with the integrated optics modules (510) or separately placed within the QC card (500).

The power supply (580) provides power used to cool the laser, modulator and APD (517) to an operating temperature. When the QC card (500) draws electric power from a base station, the power supply (580) can be bypassed, and the electric power can also be used to recharge a battery (not shown) of the QC card (500).

The fiber optic connector (532) is optically coupled to the integrated optics modules (510) of the QC card. The fiber optic connector (532) conveys single-photon pulses for QC, bright pulses for QC control/tuning, and other pulses onto optical fiber for output. In other words, when the QC card (500) is coupled to a base station, the fiber optic connector (532) optically couples the integrated optics modules (510) to a fiber optic connection of the base station. Alternatively, the QC card (500) optically couples with the base station using free space transmission between the QC card (500) and the base station, and the QC card (500) includes a connector adapted for such free space transmission.

The electrical/mechanical connector (534) is electrically coupled to the power supply (580) and, in some cases, directly to integrated optics modules (510) or other modules of the QC card (500). The electrical/mechanical connector (534) is adapted to mechanically attach the QC card (500) to a base station and draw electric power from the base station. The electric power can be used to power one or more of the integrated optics modules (510), recharge a battery of the QC card, and/or cool one or more of the integrated optics modules (510) to an operating temperature. Alternatively, the electrical/mechanical connector (534) is separated into an electrical connector and a mechanical connector, or the electrical/mechanical connector (534) is combined with the fiber optic connector (532). The electrical connector can be adapted to draw power through a wired connection with the base station. Or, the electrical connector can be adapted to draw power through a wireless connection with the base station. For example, the QC card (500) includes a coil as part of its electrical connector, and a charging pad of the base station includes a corresponding coil to transfer power by electromagnetic induction when the QC card (500) rests on the charging pad. In this case, for mechanical connection, the overall form of the QC card (500) can be adapted to fit within the charging pad. For use as a fillgun, the QC card (500) can include another connector (not shown) that is adapted to couple the QC card with another device for transmission of the one or more keys to the other device, or the fiber optic connector (532) can be used for such transmission.

The biometric reader (540) is a scanner or other module adapted to accept biometric indicia of a user. For example, the biometric reader (540) is a fingerprint scanner. The processor/FPGA (520) can include logic for encrypting the biometric indicia with a key stored in the secure memory (522). Or, one or more other encryption modules (not shown) can provide such encryption functionality.

The touch screen display (550) accepts user input (e.g., to a numeric keypad) that can be encrypted along with the biometric indicia as part of user authentication. The touch screen display (550) also displays information to the user (e.g., a count of quantum keys in memory (522), a prompt to contact the trusted authority to make quantum keys, a prompt to initiate secure communication with another, or a prompt for another function) and accepts user input to control the QC card (500). Alternatively, the QC card (500) includes another type of user input device and/or output device.

Outside of the integrated optics modules (510), most of the functional modules of the QC card (500) can be implemented with standard components for portable devices. Among the integrated optics modules (510), many of the modules (e.g., attenuator (514), monitor APD (517), splitter (516) and APD discriminator hybrid (518)) can be implemented with standard components for fiber optic communication. Other functional modules (e.g., FPGA) can be implemented with existing QKD control components that have been used with conventional QC transmitters to: (1) produce specific polarization states with a fiber-optic modulator; (2) regulate production of precisely timed QC and bright pulses in a known pattern disciplined with GPS (590) and an oscillator or atomic clock, for the trusted authority to track timing and time variations when performing QC; (3) monitor average photon number per pulse using the timing system and APD (517); (4) control APD bias, gating, and discriminator (518) electronics; (5) process conventional QC protocol control elements, e.g., to track, correct and exchange polarization state information. The integrated optics modules (510) can be implemented on a single substrate for low-cost manufacturing, or on separate substrates.

The QC card (500) shown in FIG. 5 includes modules that implement a QC transmitter. In alternative embodiments, a QC card includes modules that implement a QC receiver, and the computing device that implements the trusted authority includes modules for a QC transmitter. As part of communication over the optical fiber as the quantum channel, the QC card receives binary information for which modulation of quantum state is measured when producing the one or more keys. For example, the QC card includes a biometric reader, power supply, touch screen display and connectors as in the QC card (500) of FIG. 5. The QC card includes QC receiver modules for calibrating a filter to the narrow-frequency laser output of the QC transmitter, matching the pulse pattern for bright pulses and single-photon pulses from the QC transmitter, and synchronizing the gating of a photon detector for single-photon pulses for QC depending on pulse rate and clock phase, such that the single-photon detector is off when bright pulses are received and the bright pulses are optically switched to a multi-photon detector. Finally, the QC card also includes a processor/FPGA with protocol logic adapted for operation as a QC receiver (see the description of the FPGA for the trusted authority for details of operations).

The QC card (500) shown in FIG. 5 is adapted for communication over optical fiber. In alternative embodiments, a QC card is adapted for QC over free space with a trusted authority. For example, the QC card transmits photons through free space to a receiver terminal at a cell phone tower or other location. For this purpose, the QC card can couple with a base station that provides electric power to the QC card and aligns the QC card for transmission to the receiver terminal. The receiver terminal collects and guides photons from the QC card into an optical fiber that connects to a remote trusted authority, which may require complicated optics and suffer from loss of information. Alternatively, for purposes of QKD, the receiver terminal is a trusted intermediate node with equipment for QC reception and/or QC transmission. The receiver terminal and QC card generate quantum keys by QKD over free space. The receiver terminal and trusted authority also generate quantum keys by QKD over a fiber connection. The receiver terminal then uses a variation of a key establishment protocol to convey randomly generated secret keys to the QC card (using the quantum keys from the QKD between the QC card and receiver terminal) and to the trusted authority (using the quantum keys from the QKD between the receiver terminal and trusted authority). The QC card and central trusted authority then store the secret keys for use.

2. Example Implementations of Integrated Optic Modules.

FIGS. 6a-6c show example implementations (600, 601, 602) of integrated optics modules for a QC card. In the implementation (600) shown in FIG. 6a, a telecom laser (610) emits photons that are guided through the isolator (612) and coupling optics (614) to a waveguide or fiber (616). The waveguide or fiber (616) conveys the photons to an optical fiber (688) coupled to a fiber connector (690). A telecom detector (618) detects photons received through the fiber connector (690) as part of conventional optical communication.

A quantum laser (650) emits photons that are guided through the isolator (652) and coupling optics (654) to a waveguide (655). A switch (656) selectively engages the waveguide (655) with another waveguide that includes an attenuator (660), variable attenuator (662) and polarization controller (670). For example, the switch (656) can be implemented by changing the output port of a Mach-Zehnder interferometer. In this case, both of the switch outputs shown in FIG. 6a are actually the same output, but, when the switch (656) is thrown, the extinction ratio changes by about 27 dB. This causes a significant change in laser brightness with a quick, single step. More generally, the switch (656) acts as a variable attenuator.

The waveguide conveys the attenuated photon pulses to an optical fiber (688) coupled to a fiber connector (690). At the junction of multiple waveguides, the circulator (683) routes light from one waveguide to another waveguide depending on the direction of light propagation. Light from the fiber connector (690) is routed to the telecom detector (618), and light from the telecom laser (610) or quantum laser (650) is routed towards the fiber connector (690). The circulator (685) similarly routes light from fiber to fiber depending on the direction of light propagation.

Protocol logic (not shown) controls the variable attenuator (662) to yield single-photon pulses from the quantum laser (650). The protocol logic controls the polarization controller (670) to modulate the polarization state of the single-photon pulses and thereby encode bits of a random number for QC. For example, the quantum laser (650) operates at an appropriate telecom wavelength (such as 1310 nm or 1550 nm for fiber transmission), and the polarization controller (670) is a lithium niobate modulator. Alternatively, the quantum laser (650) operates at another suitable wavelength (such as 780 nm for free-space transmission) and/or the polarization controller (670) is a gallium arsenide (GaAs) modulator. For quantum state information being encoded in diagonal basis states and circular basis states, instead of a polarization modulator, a phase modulator can be used to change polarization from diagonal to left handedness, or to change polarization from anti-diagonal to right handedness. Finally, although FIG. 6a shows the quantum laser (650) separate from the polarization controller (670), the quantum laser (650) and polarization controller (670)/modulator can instead be more closely integrated, potentially with an amplitude modulator in the same module.

A photon detector (682) measures number of photons per pulse of the quantum laser (650). The protocol logic can use feedback from the photon detector (682) to control the variable attenuator (662). Another photon detector (684) can also be used for QC feedback purposes. For example, the first photon detector (682) is used for system calibration and normalization of the quantum laser (650) to interoperate with the telecom laser (610), and the second photon detector (684) is a single-photon detector used to evaluate whether pulses from the quantum laser (650) are single-photon pulses. In some implementations, the photon detectors (682, 684) are InGaAs detectors.

Thermo-electric cooling components (not shown) cool the lasers (610, 650) and photon detectors (682, 684) to an appropriate operating temperature.

FIG. 6a shows two lasers. Alternatively, the implementation (600) uses a single laser as both the telecom laser (610) and the quantum laser (650). If so, the attenuator (662) facilitates switching between single-photon pulses for operation as a quantum laser and bright pulses for operation as telecom laser. As shown in FIGS. 6b and 6c, additional variable attenuators can be added to facilitate such switching.

Many of the components are the same between the implementations (600, 601, 602) of FIGS. 6a-6c. Unless stated otherwise, for components with the same reference numerals in FIGS. 6a-6c, the foregoing description for FIG. 6a also applies for FIGS. 6b and 6c.

The implementation (601) in FIG. 6b lacks the switch (656) of FIG. 6a, but includes an additional variable attenuator (664) that can be used to effectively disengage the quantum laser (650). The implementation (602) of FIG. 6c also lacks the switch (656) and includes the additional variable attenuator (664). FIG. 6c shows another variation for routing and optics. The implementation (602) of FIG. 6c includes only waveguides (not optical fiber), and coupling optics (688) optically couple the waveguide (655) to the fiber connector (690). Instead of circulators (683, 685), the waveguides in the implementation (602) of FIG. 6c are shaped so that light is routed as desired.

3. Example Mobile Devices with QC Card.

Figure 7:
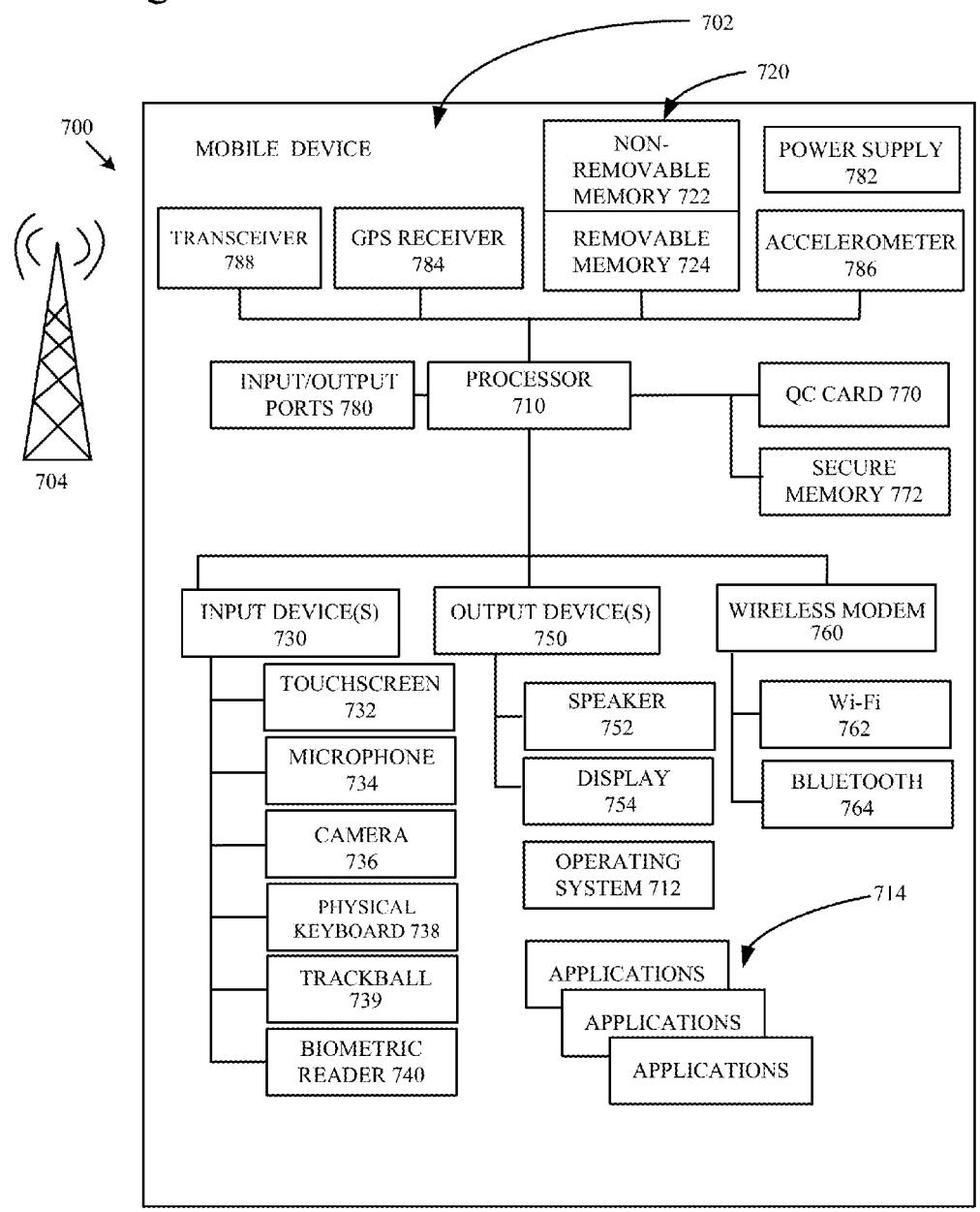
FIG. 7 is a block diagram of a mobile device that incorporates a QC card in some embodiments.

FIG. 7 is a system diagram depicting an exemplary mobile device (700) including a variety of optional hardware and software components, shown generally at (702). Any components (702) in the mobile device can communicate with any other component, although not all connections are shown, for ease of illustration. The mobile device can be any of a variety of computing devices (e.g., cell phone, smartphone, handheld computer, personal digital assistant, etc.) and can allow wireless two-way communications with one or more mobile communications networks (704), such as a cellular or satellite network.

In particular, the mobile device (700) includes a QC card (770) and secure memory (772) for storing quantum keys. For example, the QC card (770) is a variation of the QC card (500) described with reference to FIG. 5, where the mobile device (700) includes a touch screen display, biometric reader and GPS modules (instead of such components being included in the QC card (770)).

The illustrated mobile device can include a controller or processor (710) (e.g., signal processor, microprocessor, ASIC, or other control and processing logic circuitry) for performing such tasks as signal coding, data processing, input/output processing, power control, and/or other functions. An operating system (712) can control the allocation and usage of the components (702) and support for one or more application programs (714). The application programs can include common mobile computing applications (e.g., include email applications, calendars, contact managers, web browsers, messaging applications), or any other computing application. In some scenarios, an application program uses one or more of the quantum keys stored in the secure memory (772) to encrypt and/or decrypt information that is communicated with the mobile device (700).

The illustrated mobile device can include memory (720). Memory (720) can include non-removable memory (722) and/or removable memory (724). The non-removable memory (722) can include RAM, ROM, flash memory, a disk drive, or other well-known memory storage technologies. The removable memory (724) can include flash memory or a Subscriber Identity Module card, which is well known in GSM communication systems, or other well-known memory storage technologies. The memory (720) can be used for storing data and/or code for running the operating system (712) and the applications (714). Example data can include web pages, text, images, sound files, video data, or other data sets to be sent to and/or received from one or more network servers or other mobile devices via one or more wired or wireless networks.

The mobile device can support one or more input devices (730), such as a touch screen (732), microphone (734), camera (736), physical keyboard (738) and/or trackball (739) and one or more output devices (750), such as a speaker (752) and a display (754). The touch screen (732) and/or camera (736) can provide rudimentary functionality for a biometric reader, or the mobile device (700) can include a dedicated biometric reader (740). Other possible output devices (not shown) can include a piezoelectric or other haptic output device. Some devices can serve more than one input/output function. For example, touch screen (732) and display (754) can be combined in a single input/output device.

A wireless modem (760) can be coupled to an antenna (not shown) and can support two-way communications between the processor (710) and external devices, as is well understood in the art. The modem (760) is shown generically and can include a cellular modem for communicating with the mobile communication network (704) and/or other radio-based modems (e.g., Bluetooth or Wi-Fi). The wireless modem (760) is typically configured for communication with one or more cellular networks, such as a GSM network for data and voice communications within a single cellular network, between cellular networks, or between the mobile device and a public switched telephone network.

The mobile device can further include at least one input/output port (780), a power supply (782), a satellite navigation system receiver (784) such as a global positioning system receiver, an accelerometer (786), a transceiver (788) (for wirelessly transmitting analog or digital signals) and/or a physical connector, which can be a USB port, IEEE 1394 (firewall) port, and/or RS-232 port. The illustrated components (702) are not required or all-inclusive, as components can be deleted and other components can be added. A quantum key stored in the secure memory (772) can be used to encrypt and/or decrypt information transmitted or received in non-quantum communication over a public channel using the modem (760), port (780), transceiver (788) or physical connector.

C. Example Base Stations.

Figure 8:
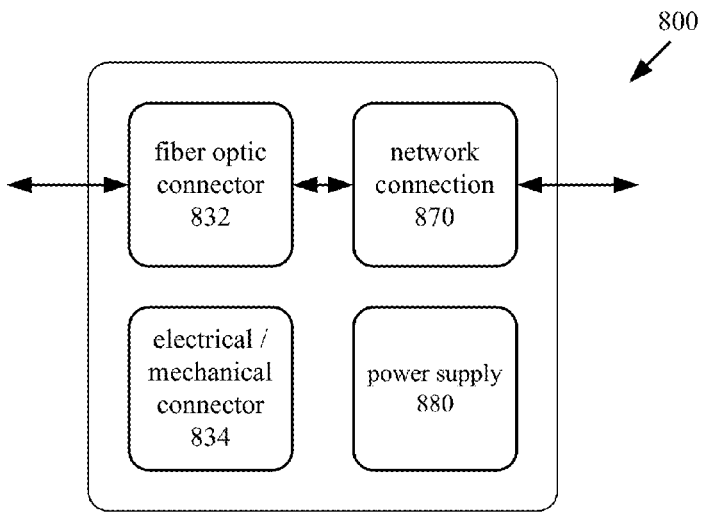
FIG. 8 is a block diagram of a generalized base station for a QC card.

FIG. 8 shows a generalized base station (800) that is adapted to couple with a QC card such as the QC card (500) explained with reference to FIG. 5. The base station (800) shown in FIG. 8 is a "dumb" terminal that includes basic components for optically and electrically coupling to a QC card and providing a network connection for QC with a trusted authority.

The base station (800) includes a network connection (870) for conveying information in a quantum channel as part of QC between the QC card and the trusted authority through the base station. For example, the network connection (870) uses a non-dedicated optical fiber for the QC in the quantum channel, and the network connection (870) also uses the non-dedicated optical fiber for non-quantum communication in a public channel between the QC card and the trusted authority. Alternatively, the network connection (870) uses another type of optical connection to the trusted authority.

The base station (800) includes a connector adapted to couple with the QC card for QC between the QC card and the trusted authority. In particular, the base station (800) includes a fiber optic connector (832) that is adapted to optically couple the QC card with the network connection (870) of the base station (800) when the QC card is coupled to the base station (800). Alternatively, the QC card optically couples with the base station (800) using free space transmission between the QC card and the base station (800), and the base station (800) includes a connector adapted for such free space transmission.

The base station (800) also includes an electrical/mechanical connector (834) that mechanically attaches the QC card to the base station (800). The connector (834) also supplies electric power through the power supply (880) to the QC card when the QC card is coupled to the base station (800). Although FIG. 8 shows the electrical connector and mechanical connector together as a single connector (834) apart from the fiber optic connector (832), the electrical connector, fiber optic connector and mechanical connector can instead be separated into three connectors or combined into a single connector. The electrical connector can be adapted to supply power through a wired connection to the QC card. Or, the electrical connector can be adapted to supply power through a wireless connection to the QC card. For example, the QC card includes a coil, and a charging pad of the base station (800) includes a corresponding coil as part of its electrical connector to transfer power by electro-magnetic induction when the QC card rests on the charging pad. In this case, for mechanical connection, the overall form of the base station (800) can be adapted so that the QC card fits within the charging pad.

In implementations in which the base station (800) is a "dumb" terminal, the base station (800) provides a fiber connection to the trusted authority and provides electric power to the QC card (e.g., for powering the QC card, recharging a battery of the QC card), which gives the base station a simple and inexpensive design. The base station need not provide security features, since system security is provided by the QC card and the trusted authority.

In alternative embodiments, the base station is a trusted terminal or partially trusted terminal that includes components that provide additional functionality for QKD between a trusted authority and QC card coupled with the base station. As a trusted terminal, a base station performs QKD with the trusted authority and uploads keys to a QC card when a user has been authenticated by a trusted authority using the QC card. The QC card can be much smaller and less expensive, since it no longer has QC components.

As a partially trusted terminal, a base station provides services such as photon level monitoring, timing control, etc. For example, the base station includes a photon detector adapted to monitor number of photons per pulse and programmable logic that is configured to control the timing and pattern of pulses produced by a laser for the QC. The programmable logic can also be configured to control pulses produced by another laser for timing, non-quantum communication, and/or other purposes. A QC card couples to the partially trusted base station to enable QC transmission, but the QC card can be smaller and less expensive than a QC card adapted to couple to a dumb terminal. The QC card is less secure in the partially trusted terminal model, however. An adversary with access to the partially trusted base station can make it cause the QC card to send photon pulses that are more susceptible to interception or eavesdropping.

D. Example Trusted Authority Adapted for QKD with QC Card.

Figure 9:
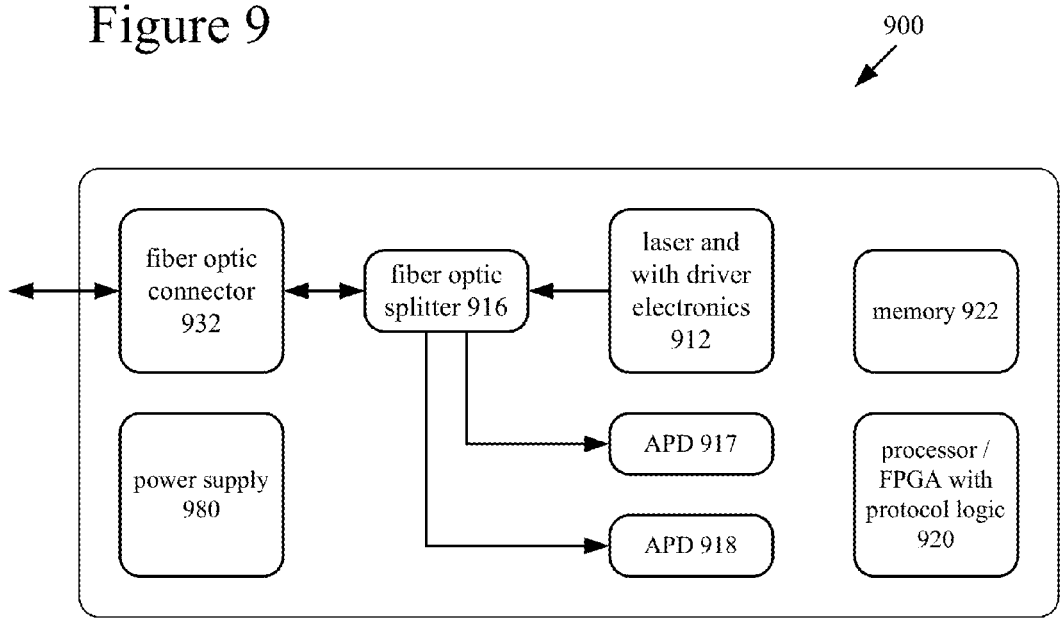
FIG. 9 is a block diagram of a generalized trusted authority adapted to QKD with a QC card.

FIG. 9 shows a generalized computing system (900) that implements a trusted authority adapted for QKD with a QC card. At a high level, the computing system (900) includes a connector, optics modules, power supply (980) and memory for storing quantum keys.

In FIG. 9, the optics modules are adapted for communication over non-dedicated optical fiber. For QC over the optical fiber as a quantum channel, the optics modules measure modulation of the quantum state of binary information received from a QC transmitter of a QC card coupled to a base station. The optics modules also provide a network transceiver adapted to transmit and receive information in a public channel over the optical fiber.

The fiber optic connector (932) optically couples the optics modules of the computing system (900) to a fiber optic connection. The connector (932) conveys single-photon pulses for QC, bright pulses for QC control/tuning, and other pulses received over optical fiber to a fiber splitter (916) or splitters. (Although FIG. 9 shows a simple splitter (916), the splitter can implement sophisticated routing and gating logic as described below with reference to the processor/FPGA (920).) Single-photon pulses for QC are received by an APD (917), and a polarimeter measures quantum state of the single-photon pulses. Other pulses (e.g., bright pulses for timing, synchronization, tuning, conventional fiber optic communication, etc.) are received by another APD (918) or other detector (not shown) for conventional fiber optic reception.

The laser and driver electronics (912) produces pulses as a conventional transmitter. With the laser, the computing system (900) transmits information (e.g., information about measuring bases in QKD, other QKD protocol information) in non-quantum communication over the optical fiber as a public channel.

The processor/FPGA (920) with protocol logic controls operations for user authentication. For example, when an encrypted message for user authentication is received from the QC card by conventional transmission over the optical fiber as a public channel, the processor/FPGA (920) determines a previously stored key in memory (922) and decrypts the message using the key. The processor/FPGA (920) analyzes the contents of the message (e.g., comparing the contents to stored biometric indicia, PIN, other identifying information, etc. for the user) and, if appropriate, authenticates the user.

The processor/FPGA (920) also controls operations for the QC protocol to produce quantum keys with the QC card coupled to the base station, and then store the quantum keys in association with the user in the memory (922). For example, the processor/FPGA (920) controls a polarimeter to measure the quantum state per pulse for QC and records the measured quantum state and measuring basis. After QC transmission/reception, the processor/FPGA (920) controls exchange of information in non-quantum communication with the QC card over the optical fiber, transmitting the recorded measuring bases and receiving QC protocol control elements from the QC card. The processor/FPGA processes the QC protocol control elements to determine the quantum keys.

More specifically, to enable QC reception and conventional transceiver functions, the processor/FPGA (920) controls the optics modules according timing and pattern of single-photon pulses produced for the QC and to bright pulses produced for timing and/or the non-quantum communication. For example, the processor/FPGA (920) calibrates a filter to the narrow-frequency laser output of the QC transmitter, matches the pulse pattern for bright pulses and single-photon pulses from the QC transmitter, and synchronizes the gating of a photon detector for single-photon pulses for QC depending on pulse rate and clock phase, such that the single-photon detector is off when bright pulses are received and the bright pulses are optically switched to a multi-photon detector.

The processor/FPGA (920) can also control operations for a secure multi-party communication protocol that uses quantum keys. For example, the processor/FPGA (920) controls operations to generate and encrypt session keys with stored quantum keys to devices that have quantum keys from prior QKD with the trusted authority.

The memory (922) stores one or more keys that are produced based at least in part on the QC. For example, the memory (922) stores quantum keys produced in QKD between the QC card and the trusted authority. The memory (922) potentially stores quantum keys for multiple user devices, indexed by user. The memory (922) can also store other keys, such an initial pre-placed secret key used for authentication purposes for a give user. In some implementations, the memory (922) is secure memory in that the computing system (900) controls access to the memory (922), the keys are stored in encrypted form in the memory (922), and/or the memory (922) is resistant to physical tampering.

The computing system (900) shown in FIG. 9 includes modules that implement a QC receiver. In alternative embodiments, a computing system for the trusted authority includes modules that implement a QC transmitter. The QC transmitter transmits information in a quantum channel as part of QC with a QC card that is coupled to a base station. For example, the computing system for the trusted authority includes a conventional QC transmitter.

The computing system (900) shown in FIG. 9 is adapted for communication over optical fiber. In alternative embodiments, a computing system that implements a trusted authority is adapted for QC over free space with a QC card.

E. Example Uses of Optical Fiber for QC and Non-QC.

Figure 10:
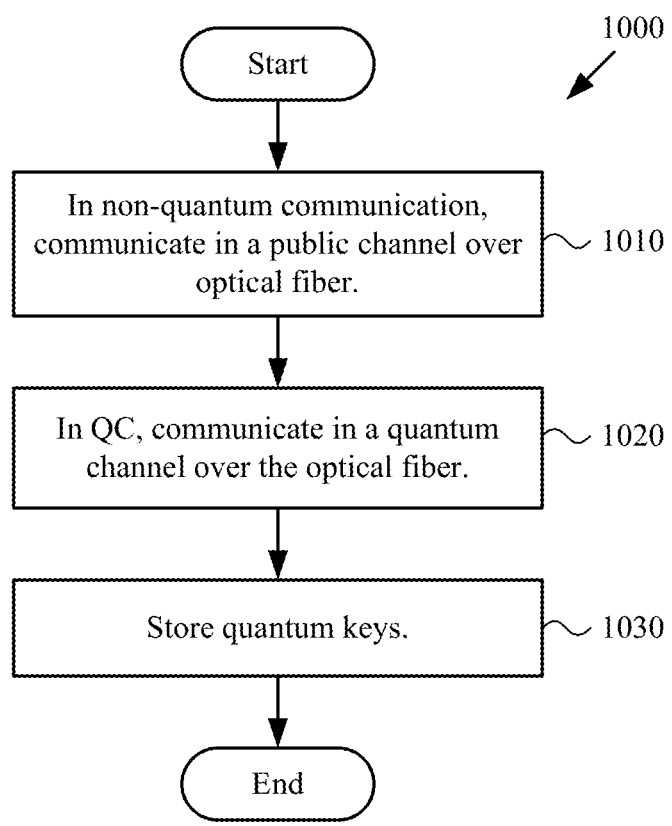
FIG. 10 is a flowchart illustrating use of the same optical fiber as a quantum channel and public channel.

FIG. 10 shows a generalized technique (1000) for using the same optical fiber for both QC and non-quantum communication. A first device performs the technique (1000) in communication with a second device. For example, the first device is a QC card, and the second device is a computing system that implements a trusted authority. Alternatively, the roles are switched—the first device is a computing system that implements a trusted authority, and the second device is a QC card.

In non-quantum communication with a second device, the first device communicates (1010) in a public channel over optical fiber. In QC with the second device, the first device also communicates (1020) in a quantum channel over the optical fiber. The information content in the quantum channel is encoded in quantum states (e.g., polarization states of single-photon pulses). The information content in the public channel is encoded conventional non-quantum techniques for network communication over optical fiber. The first device and second device produce one or more keys, for example, through QKD according to a QC protocol. The first device then stores one or more of the resulting keys.

When the first device is a QC card with a miniaturized QC transmitter and the second device is a computing system that implements the trusted authority, the QC card transmits and receives information in the public channel, and the QC card transmits information in the quantum channel for QC with the trusted authority. For example, for the non-quantum communication in the public channel over the optical fiber, (1) before the QC begins, the QC card transmits encrypted identification information for a user of the QC card to the trusted authority for authentication; and (2) after the QC but before the one or more keys are finalized, the QC card transmits and receives QC protocol elements to/from the trusted authority.

On the other hand, when the first device is a computing system that implements the trusted authority and the second device is a QC card with a miniaturized QC transmitter, the computing system that implements the trusted authority transmits and receives information in the public channel, and the computing system receives information in the quantum channel for QC with the QC card. For example, for the non-quantum communication in the public channel over the optical fiber, the computing system that implements the trusted authority: (1) before the QC begins, receives encrypted identification information for a user of the QC card for authentication; and (2) after the QC but before the one or more keys are finalized, transmits and receives QC protocol elements to/from the QC card.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A quantum communication device comprising:
    a connector adapted to couple with a base station for quantum communication with a trusted authority over a network between the base station and the trusted authority, wherein the connector is further adapted to decouple from the base station, the base station and the quantum communication device being separate devices;
    one or more integrated optics modules adapted to transmit or receive information in a quantum channel as part of the quantum communication through the base station, the one or more integrated optics modules being optically coupled to the connector; and
    memory for storing one or more keys produced based at least in part on the quantum communication.

2. The quantum communication device of claim 1 wherein the one or more integrated optics modules are adapted for communication in the quantum channel over non-dedicated optical fiber as at least part of the network, wherein the communication over the optical fiber as the quantum channel includes transmission or receipt of binary information for which modulation of quantum state is measured when producing the one or more keys.

3. The quantum communication device of claim 2 wherein the one or more integrated optics modules include:
    network transceiver adapted to transmit and receive information in a public channel over the non-dedicated optical fiber, the network transceiver being optically coupled to the connector, wherein the communication over the optical fiber as the public channel includes transmission and receipt of binary information for which modulation of quantum state is not measured when producing the one or more keys.

4. The quantum communication device of claim 1 wherein the one or more integrated optics modules include:
    a laser adapted to generate photons for transmission in the quantum communication;
    a modulator adapted to modulate quantum state of output of the laser, the modulator being optically coupled to the laser; and
    programmable logic configured to coordinate operations of the laser and the modulator, the programmable logic being electrically coupled to the laser and the modulator.

5. The quantum communication device of claim 4 wherein the modulated quantum state is polarization, and wherein the one or more integrated optics modules further include, on a single substrate with the laser, the modulator, and the programmable logic:
    an attenuator adapted to reduce photons per pulse of the laser, the attenuator being optically coupled to the laser; and
    a photon detector adapted to monitor number of photons per pulse, the photon detector being optically coupled to the laser.

6. The quantum communication device of claim 4 wherein the programmable logic is configured to control operations comprising:
    controlling the quantum state to be set with the modulator based at least in part upon a random number generated by a random number generator;
    recording the quantum state and sending basis per pulse for the quantum communication;
    in non-quantum communication with the trusted authority in a public channel, transmitting the recorded sending bases to the trusted authority; and
    processing results of the quantum communication to determine the one or more keys.

7. The quantum communication device of claim 6 wherein the programmable logic is further configured to control operations comprising:
    controlling timing and pattern of single-photon pulses produced by the laser for the quantum communication and bright pulses produced for timing, the non-quantum communication and/or other purposes;
    monitoring number of photons per pulse for the quantum communication; and
    controlling one or more variable attenuators to reduce photons per pulse of the laser for the quantum communication.

8. The quantum communication device of claim 1 wherein the connector includes:
    a fiber connector adapted to optically connect the one or more integrated optics modules to a fiber connection of the base station when the quantum communication device is coupled with the base station;
    an electrical connector adapted to draw electric power from the base station, when the quantum communication device is coupled with the base station, for performing one or more of:
        powering at least some of the one or more integrated optics modules,
        recharging a battery of the quantum communication device, and
        cooling at least some of the one or more integrated optics modules to an operating temperature; and
    a mechanical connector adapted to mechanically attach the quantum communication device to the base station, wherein the mechanical connector is further adapted to mechanically detach the quantum communication device from the base station.

9. A mobile device including the quantum communication device of claim 1, the mobile device further including:
a processor;
computer memory;
storage that stores software, the software including instructions for using the one or more keys to encrypt information for non-quantum communication in a public channel; and
a display.

10. The quantum communication device of claim 1 further comprising:
a second connector adapted to couple the quantum communication device with another device for transmission of the one or more keys to the other device, wherein the second connector is further adapted to decouple the quantum communication device from the other device.

11. The quantum communication device of claim 1 further comprising:
a biometric scanner adapted to accept biometric indicia of a user; and
one or more encryption modules adapted to encrypt the biometric indicia, wherein the production of the one or more keys is contingent on the trusted authority authenticating the user using the encrypted biometric indicia.

12. A base station comprising:
a network connection for conveying information in a quantum channel as part of quantum communication between a quantum communication device and trusted authority through the base station; and
a connector adapted to couple with the quantum communication device for the quantum communication between the quantum communication device and the trusted authority, wherein the connector is adapted to optically couple the quantum communication device with the network connection when the quantum communication device is coupled to the base station, and wherein the connector is further adapted to decouple from the quantum communication device, the base station and the quantum communication device being separate devices.

13. The base station of claim 12 wherein the connector is further adapted to supply electric power to the quantum communication device when the quantum communication device is coupled to the base station.

14. The base station of claim 12 wherein the network connection is adapted to use non-dedicated optical fiber for the quantum communication in the quantum channel, and wherein the network connection is also adapted to use the non-dedicated optical fiber for non-quantum communication in a public channel between the quantum communication device and the trusted authority.

15. The base station of claim 12 further comprising:
a photon detector adapted to monitor number of photons per pulse; and
programmable logic configured to control timing and pattern of pulses produced by a first laser for the quantum communication and pulses produced by a second laser for timing and/or non-quantum communication.

16. The base station of claim 12 wherein the connector is a combined connector that includes:
a fiber connector adapted to provide the optical coupling of the quantum communication device to the network connection of the base station when the base station is coupled with the quantum communication device;
an electrical connector adapted to supply electric power to the quantum communication device when the base station is coupled with the quantum communication device; and
a mechanical connector adapted to mechanically attach the quantum communication device to the base station, wherein the mechanical connector is further adapted to mechanically detach the quantum communication device from the base station.

17. A computing system comprising:
a quantum communication module adapted to transmit or receive information in a quantum channel as part of quantum communication with a quantum communication device that is detachably coupled to a base station in communication with a trusted authority over a network, the base station and the quantum communication device being separate devices;
a network transceiver adapted to transmit and receive information in a public channel;
programmable logic configured to implement the trusted authority by performing operations that comprise:
receiving an encrypted message in the public channel from the quantum communication device detachably coupled to the base station;
authenticating a user of the quantum communication device based at least in part upon decryption of the encrypted message received in the public channel;
producing one or more keys based at least in part on the quantum communication with the quantum communication device detachably coupled to the base station; and
storing the one or more keys in association with the user of the quantum communication device; and
memory for storing the one or more keys.

18. The computing system of claim 17 wherein the quantum channel and public channel are provided over the same optical fiber as at least part of the network.

19. The computing system of claim 17 wherein the programmable logic is configured to control operations comprising:
measure the quantum state per pulse for the quantum communication;
recording the measured quantum state and measuring basis per pulse for the quantum communication;
in non-quantum communication with the quantum communication device in the public channel, transmitting the recorded measuring bases to the quantum communication device; and
processing results of the quantum communication to determine the one or more keys.

20. The computing system of claim 19 wherein the programmable logic is further configured to control operations comprising:
adapting the quantum communication module and the network transceiver to timing and pattern of single-photon pulses produced by a first laser for the quantum communication and to bright pulses produced by a second laser for timing and/or the non-quantum communication.

21. A method comprising:
coupling a quantum communication device to a base station for quantum communication between the quantum communication device and a trusted authority over a network between the base station and trusted authority;
producing one or more keys based at least in part upon the quantum communication and based at least in part upon non-quantum communication with the trusted authority; and decoupling the quantum communication device from the base station.

22. The method of claim 21 further comprising:
storing the one or more keys in memory of the quantum communication device.

23. The method of claim 22 further comprising:
with the quantum communication device, transmitting the one or more keys to a second device for storage in memory of the second device.

24. The method of claim 21 further comprising:
with the quantum communication device, in the quantum communication with the trusted authority through the base station, transmitting information encoded in quantum states.

25. The method of 21 wherein the quantum communication device includes:
a connector adapted to couple and decouple with the base station;
one or more integrated optics modules adapted to transmit or receive the information in a quantum channel as part of the quantum communication through the base station, the one or more integrated optics modules being optically coupled to the connector; and
memory for storing the one or more keys.

26. The method of 21 wherein the non-quantum communication is between the quantum communication device and the trusted authority through the base station, wherein the quantum communication uses a quantum channel over optical fiber as at least part of the network, and wherein the non-quantum communication uses a public channel over the optical fiber.

27. The method of claim 21 further comprising, before the quantum communication:
with the quantum communication device, receiving identifying information for a user;
with the quantum communication device, encrypting a message that indicates the identifying information using an authentication key; and
with the quantum communication device, transmitting the encrypted message to the trusted authority for authentication of the user by the trusted authority, wherein the authentication of the user is a condition of the quantum communication.

28. The method of claim 27 wherein the receiving the identifying information includes one or more of:
receiving biometric indicia for the user; and
receiving numeric input that indicates a personal identifier number for the user.

29. The method of claim 27 wherein the authentication key is a pre-placed key in the quantum communication device that is known to the trusted authority.

30. The method of claim 27 wherein the authentication key was produced during a prior session of quantum communication between quantum communication device and the trusted authority and then stored in the quantum communication device.

31. The method of claim 21 wherein the quantum communication device and the trusted authority communicate over the network directly or through multiple spans of the network using devices with quantum communication transceivers.

32. The method of claim 21 further comprising, with quantum communication device:
controlling timing and pattern of single-photon pulses produced by a laser for the quantum communication and bright pulses produced by a second laser for timing and/or the non-quantum communication;
monitoring number of photons per pulse for the quantum communication;
controlling one or more variable attenuators to reduce photons per pulse of the laser for the quantum communication;
controlling quantum state to be set with a modulator based at least in part upon a random number generated by a random number generator; and
recording the quantum state and sending basis per pulse for the quantum communication.

33. The method of claim 21 further comprising, when the quantum communication device is coupled to the base station:
with the quantum communication device, drawing electric power from the base station;
powering at least some of one or more integrated optics modules of the quantum communication device with the electric power; and
cooling at least some of the one or more integrated optics modules to an operating temperature.

34. A method comprising, with a computing system that implements a trusted authority:
establishing quantum communication with a quantum communication device through a base station in communication with the trusted authority over a network, the quantum communication device being detachably coupled to the base station, wherein the base station and the quantum communication device are separate devices;
as part of the quantum communication with the quantum communication device detachably coupled to the base station, receiving or transmitting information encoded in quantum states; and
producing one or more keys based at least in part upon the quantum communication and based at least in part upon non-quantum communication with the quantum communication device.

35. The method of claim 34 further comprising:
storing the one or more keys in memory of the computing system.

36. The method of 34 wherein the non-quantum communication is between the quantum communication device and the trusted authority through the base station, wherein the quantum communication uses a quantum channel over optical fiber as at least part of the network, and wherein the non-quantum communication uses a public channel over the optical fiber.

37. The method of claim 34 wherein the establishing the quantum communication includes:
receiving an encrypted message that indicates identifying information for a user of the user device, the encrypted message having been encrypted with an authentication key;
decrypting the encrypted message; and
determining whether to authenticate the user based at least in part on the identifying information, wherein the authentication of the user is a condition of the quantum communication.

38. The method of claim 37 wherein the identifying information includes one or more of biometric indicia for the user and a personal identifier number.

39. The method of claim 37 wherein the authentication key is a pre-placed key in the quantum communication device that is known to the trusted authority.

40. The method of claim 37 wherein the authentication key was produced during a prior session of quantum communication between quantum communication device and the trusted authority and then stored in the quantum communication device.

41. The method of claim 34 further comprising:
adapting a quantum communication receiver and a network transceiver to timing and pattern of single-photon pulses produced by a first laser for the quantum communication and bright pulses produced by a second laser for timing and/or the non-quantum communication;
as part of the quantum communication:
measuring quantum state per pulse of the quantum communication; and
recording the measured quantum state and measuring basis per pulse of the quantum communication.

42. A method comprising:
with a first device in non-quantum communication with a second device, communicating in a public channel over optical fiber, wherein the first device is a quantum communication device detachably coupled to a base station in communication with the second device over a network that includes the optical fiber, wherein the base station and the quantum communication device are separate devices, and wherein the second device is a computing system that implements a trusted authority;
with the first device in quantum communication with the second device, communicating in a quantum channel over the optical fiber, the information in the quantum channel being encoded in quantum states; and
storing one or more keys that result from the communication in the quantum channel and at least some of the communication in the public channel.

43. The method of claim 42 wherein the quantum communication device transmits and receives information in the public channel in the non-quantum communication with the computing system, and wherein the quantum communication device transmits or receives the information in the quantum channel in the quantum communication with the computing system.

44. The method of claim 43 wherein the non-quantum communication includes:
before the quantum communication begins, transmitting encrypted identification information for a user of the quantum communication device to the computing system for authentication;
after the quantum communication but before the one or more keys are finalized, transmitting and receiving protocol elements between the quantum communication device and the computing system; and
after the one or more keys are finalized, receiving information usable with at least one stored key from the computing system.

* * * * *